US009923502B2

(12) United States Patent
Iwaji et al.

(10) Patent No.: US 9,923,502 B2
(45) Date of Patent: Mar. 20, 2018

(54) SYNCHRONOUS MOTOR CONTROL APPARATUS AND DRIVE SYSTEM USING THE SAME

(71) Applicant: HITACHI AUTOMOTIVE SYSTEMS, LTD., Hitachinaka-shi, Ibaraki (JP)

(72) Inventors: Yoshitaka Iwaji, Tokyo (JP); Masaki Hano, Hitachinaka (JP); Naoki Okamoto, Hitachinaka (JP); Takeshi Umetsu, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 15/313,290

(22) PCT Filed: May 11, 2015

(86) PCT No.: PCT/JP2015/063426
§ 371 (c)(1),
(2) Date: Nov. 22, 2016

(87) PCT Pub. No.: WO2015/182352
PCT Pub. Date: Dec. 3, 2015

(65) Prior Publication Data
US 2017/0194889 A1 Jul. 6, 2017

(30) Foreign Application Priority Data
May 28, 2014 (JP) .................................. 2014-109656

(51) Int. Cl.
*H02P 21/00* (2016.01)
*H02K 29/06* (2006.01)
(Continued)

(52) U.S. Cl.
CPC ................ *H02P 21/24* (2016.02); *H02P 6/18* (2013.01); *H02P 27/08* (2013.01); *H02P 6/187* (2013.01)

(58) Field of Classification Search
None
See application file for complete search history.

(56) References Cited

U.S. PATENT DOCUMENTS

| 5,327,053 A | 7/1994 | Mann et al. |
| 2001/0030517 A1 | 10/2001 | Batzel |

(Continued)

FOREIGN PATENT DOCUMENTS

| JP | 2007-028869 A | 2/2007 |
| JP | 2009-189176 A | 8/2009 |

(Continued)

OTHER PUBLICATIONS

International Search Report, PCT/JP2015/063426, Jul. 21, 2015, 2 pgs.

*Primary Examiner* — Bentsu Ro
*Assistant Examiner* — Zemenay Truneh
(74) *Attorney, Agent, or Firm* — Volpe and Koenig, P.C.

(57) ABSTRACT

A method for detecting a potential (Vn) includes stator wirings in a Y connection, and automatically adjusting a relationship with a position of a rotor as a system for realizing rotor position-sensorless stable drive of an AC motor where the three-phase stator wirings are in Y connection in the stop and low-speed ranges. A synchronous motor control apparatus includes a three-phase synchronous motor in which three-phase stator wirings are in a Y connection, and an inverter for driving the motor, wherein the synchronous motor is DC-conducted thereby to move a rotor to a predetermined position, and is applied with a pulse-shaped voltage from the inverter in the moved state so that a neutral point potential as potential (Vn) of the Y connection point is (Continued)

acquired when the pulse voltage is applied, thereby driving the synchronous motor based on the acquired value.

12 Claims, 18 Drawing Sheets

(51) Int. Cl.
*H02P 21/24* (2016.01)
*H02P 6/18* (2016.01)
*H02P 27/08* (2006.01)

(56) References Cited

U.S. PATENT DOCUMENTS

| | | |
|---|---|---|
| 2007/0018599 A1 | 1/2007 | Yamamoto et al. |
| 2009/0200971 A1 | 8/2009 | Iwaji et al. |
| 2010/0066284 A1* | 3/2010 | Iwaji .................. H02P 6/187 318/400.02 |
| 2011/0234133 A1 | 9/2011 | Hano et al. |
| 2013/0243625 A1 | 9/2013 | Iwaji et al. |
| 2014/0055066 A1 | 2/2014 | Harada |
| 2014/0077738 A1 | 3/2014 | Iwaji et al. |
| 2015/0069941 A1 | 3/2015 | Iwaji et al. |
| 2015/0207447 A1 | 7/2015 | Sato |

FOREIGN PATENT DOCUMENTS

| | | |
|---|---|---|
| JP | 2010-074898 A | 4/2010 |
| JP | 2012-010477 A | 1/2012 |
| JP | 2014-027735 A | 2/2014 |
| WO | 2012/029451 A1 | 3/2012 |
| WO | 2012/147197 A1 | 11/2012 |
| WO | 2012/157039 A1 | 11/2012 |
| WO | 2013/153657 A1 | 10/2013 |

* cited by examiner

FIG. 2
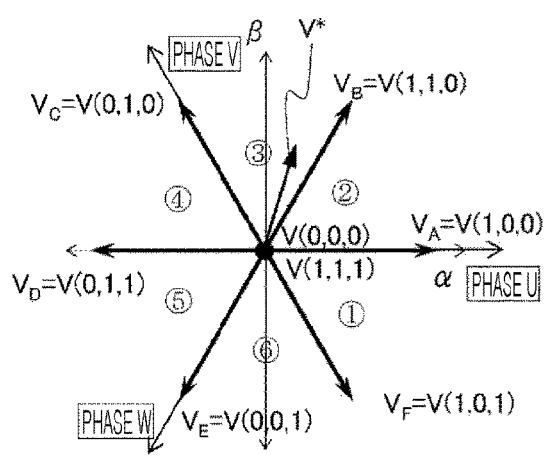
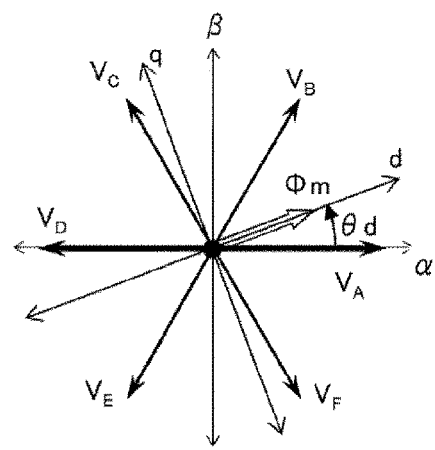
(a) OUTPUT VOLTAGES OF INVERTER
(b) $\theta d$ AND VOLTAGE VECTORS

- START
- (S1) SET SW21a TO 21d AT "0" AND SW21e AT "1"
- (S2C) POSITION: $\theta dc=-75[\deg]$, $Id=I0$
- (S3) SET SW21e AT "0"
- (S4) APPLY VA AND ACQUIRE VnA0
- (S5) SET SW21e AT "1"
- (S6C) POSITION: $\theta dc=-15[\deg]$, $Id=I0$
- (S7) SET SW21e AT "0"
- (S8) APPLY VA AND ACQUIRE VnA1
- (S9) CALCULATE APPROXIMATE FUNCTION COEFFICIENTS A1 AND B1
- (S10) SET SW21a TO 21e AT "1"
- END

DIFFERENT VALUES

NEUTRAL POINT POTENTIAL $V_n$ [p.u.]

POSITION OF ROTOR $\theta d$ [deg]

| θ d[deg]<br>(0 TO 360) | | M1<br>225 TO 285 | M2<br>285 TO 345 | M3<br>345 TO 45 | M4<br>45 TO 105 | M5<br>105 TO 165 | M6<br>165 TO 225 |
|---|---|---|---|---|---|---|---|
| Vn DETECTION VOLTAGE VECTOR | Tc1 | VC | VA | VE | VC | VA | VE |
| | Tc2 | VF | VD | VB | VF | VD | VB |
| VnS | | VnC−VnF | VnA−VnD | VnE−VnB | VnC−VnF | VnA−VnD | VnE−VnB |

FIG. 23

| | $\theta d$ | M1 | M2 | M3 | M4 | M5 | M6 |
|---|---|---|---|---|---|---|---|
| | | −135 TO −75 | −75 TO −15 | −15 TO 45 | 45 TO 105 | 105 TO 165 | 165 TO 225 |
| | Tc1 | VC | VA | VE | VC | VA | VE |
| | Tc2 | VF | VD | VB | VF | VD | VB |
| V1 | Max: Vu0<br>Mid: Vw0<br>Min: Vv0 | [B] | [A] | [C] | [B] | [A] | [C] |
| V2 | Max: Vu0<br>Mid: Vv0<br>Min: Vw0 | [C] | [A] | [B] | [C] | [A] | [B] |
| V3 | Max: Vv0<br>Mid: Vu0<br>Min: Vw0 | [A] | [C] | [B] | [A] | [C] | [B] |
| V4 | Max: Vv0<br>Mid: Vw0<br>Min: Vu0 | [A] | [B] | [C] | [A] | [B] | [C] |
| V5 | Max: Vw0<br>Mid: Vv0<br>Min: Vu0 | [C] | [B] | [A] | [C] | [B] | [A] |
| V6 | Max: Vw0<br>Mid: Vu0<br>Min: Vv0 | [B] | [C] | [A] | [B] | [C] | [A] |

FIG. 24

| | INSTRUCTION VALUE CORRECTION IN Tc1 | INSTRUCTION VALUE CORRECTION IN Tc2 | S/H TIMING |
|---|---|---|---|
| [A] | Max1 = 2Max−Mid+Vsh<br>Mid1 = Mid<br>Min1 = 2Min−Mid | Max2 = Mid−Vsh<br>Mid2 = Mid<br>Min2 = Mid | Mid1,<br>Mid2 |
| [B] | Max1 = Mid<br>Mid1 = Mid<br>Min1 = Mid+Vsh | Max2 = 2Max−Mid<br>Mid2 = Mid<br>Min2 = 2Min−Mid−Vsh | Mid1,<br>Mid2 |
| [C] | Max1 = Max<br>Mid1 = Max+Vsh<br>Min1 = 2Min−Max | Max2 = Max<br>Mid2 = 2Mid−Max−Vsh<br>Min2 = Max | Max1,<br>Max2 |

SYNCHRONOUS MOTOR CONTROL APPARATUS AND DRIVE SYSTEM USING THE SAME

TECHNICAL FIELD

The present invention relates to a motor drive technique employed in applications using rotation speed control for pump, fan, compressor, spindle motor, and the like, positioning control for conveyer, lift, and machine, and torque control for motor assist and the like, for example.

BACKGROUND ART

In the fields of home electrical appliances, industries, and automobiles, motor drive apparatuses are employed in rotation speed control for fan, pump, compressor, and the like, torque assist devices for electric power steering and the like, and positioning control for conveyer and lift. A permanent magnet synchronous motor (which will be denoted as "PM motor" below), which is a small and high-efficiency AC motor, is widely employed in the motor drive apparatuses in these field. However, information on magnetic pole position of a rotor of the motor is required for driving the PM motor, and a position sensor such as resolver or hall IC therefor is essential. In recent years, there is widely used sensorless control for controlling a frequency or torque of a PM motor without the use of such a position sensor.

The realization of sensorless control enables cost for the position sensor (cost for sensor itself, cost for sensor wiring, and cost for sensor attachment/adjustment work) to be reduced, and the unnecessity of the sensor accordingly causes a merit that an apparatus can be downsized or can be used under deteriorated environments.

At present, the sensorless control for PM motor employs a system for directly detecting an inductive voltage (speed induced voltage) caused by rotation of a rotor and assuming it as rotor position information thereby to drive the PM motor, a position estimation technique for estimating and calculating a position of the rotor based on the mathematical models of a PM motor, and the like.

These are a system using a speed induced voltage in principle, and are difficult to apply in an area where the speed induced voltage is low due to stop or in a low-speed period. Thus, these techniques are applied mainly in middle- and high-speed ranges, and open loop control such as V/F constant control is employed in a low speed range. In the case of open loop control, motor-generated torque cannot be freely controlled, and thus controllability in the low speed range is deteriorated and the efficiency is also deteriorated.

There has been already proposed a system for acquiring rotor position information in a low speed range against the above.

In PTL 1, a pulse voltage is applied to two phases in a three-phase PM motor and an open voltage of the non-conducted remaining phase is detected thereby to acquire position information from the voltage. An induced voltage in the open phase is generated depending on a position of the rotor of the PM motor, and can be used to estimate a position of the rotor. The induced voltage is generated by a slight change in inductance in the motor due to a relationship between a permanent magnetic flux attached on the rotor of the PM motor and a conductive current by the pulse voltage, and can be observed also in the stop state. This is denoted as "magnetic saturation induced voltage."

Further, in the system, 120-degree conductive drive is essential to select and conduct two phases out of the three phases in order to observe an induced voltage of the non-conducted phase (open phase). The conducted phases need to be switched depending on a position of the rotor in order to perform position-sensorless drive. The "magnetic saturation induced voltage" caused in the open phase is used for switching the conducted phases.

The magnetic saturation induced voltage monotonically increases or decreases depending on a position of the rotor. Thus, in PTL 1, position sensorless control is performed to switch to a next conducted-phase when a "threshold" is provided for the induced voltage of the open phase and the magnetic saturation induced voltage reaches the threshold. At this time, the "threshold" is a remarkably important setting element. The threshold slightly varies per motor or per phase wiring of the motor, and needs to be appropriately set. PTL 2 describes therein a method for automatically performing an adjustment work therefor per motor.

To the contrary of the method described in PTL 1, in PTL 2, an automatic adjustment routine is previously performed on a threshold, and thus a worker does not need to manually make the adjustment, thereby saving the system startup work.

The published patents assume the 120-degree conductive drive, but a sinusoidal drive method has been already reported. In PTLs 3 and 4, a PM motor employs a three-phase stator wiring in Y connection thereby to observe a connection point potential of the three-phase wiring in Y connection (which is denoted as neutral point potential), thereby estimating a position of the rotor.

An open phase does not need to be observed unlike in PTL 1, and thus three phases can be conducted at the same time, thereby driving a PM motor at an ideal sinusoidal current. However, it is essential to detect a neutral point potential.

PTL 3 describes therein a voltage pulse insertion method for observing a neutral point potential. Further, PTL 4 describes that a neutral point potential is observed in association with a PWM pulse for pulse width modulation by use of a voltage applied to an inverter for driving the PM motor, thereby instantaneously estimating and calculating a position of the rotor.

CITATION LIST

Patent Literature

PTL 1: JP 2009-189176 A
PTL 2: JP 2012-10477 A
PTL 3: JP 2010-74898 A
PTL 4: WO 2013/153657 A1

SUMMARY OF INVENTION

Technical Problem

According to PTL 1, torque can be generated without loss of synchronism of the motor in the stop and low-speed states. Further, PTL 2 describes the automatic adjustment of a "threshold" which is an important setting constant for realizing sensorless drive in PTL 1. However, the methods in PTLs 1 and 2 are based on the 120-degree conductive drive, which causes remarkably high current harmonic at the time of drive of the PM motor. Consequently, loss of harmonic may be increased or vibration/noise due to torque pulsation may be caused. It is desirable that the PM motor is ideally driven at a sinusoidal current.

PTLs 3 and 4 describe that a neutral point potential of the stator wiring in the PM motor is observed thereby to drive the PM motor from zero-speed at a sinusoidal current. Further, the PM motor is not limited in term of its structure (is not limited to an embedded-magnet type, for example), and has broad utility. However, PTLs 3 and 4 have the following unsolved problems.

PTL 3 describes a method for switching three conducted phases by use of an observed neutral point potential, but does not specifically describe how to set a neutral point potential to be switched, a difference depending on a specification of the motor, or a response to three-phase unbalance. Thus, an adjustment work is required per motor in order to realize the method in PTL 3, which is practically problematic. In particular, it is difficult to apply to mass-produced products.

PTL 4 describes that when two voltage patterns are applied, a neutral point potential is observed in each voltage pattern and is subjected to signal processing thereby to estimate and calculate a position of a rotor in the PM motor. However, it does not cope with three-phase unbalance, and when only inductance in a specific phase is different from others, a large pulsation component can be caused at an estimated position of the rotor. Further, the two voltage patterns can be created by pulse width modulation due to a typical triangle wave carrier, but a large number of AD converters or timers as the functions of a controller need to be prepared for detecting a neutral point potential corresponding to each voltage pattern. When an inexpensive microcomputer is used, its functions are insufficient and the method according to PTL 4 cannot be applied thereto.

It is an object of the present invention to provide a synchronous motor control apparatus for automatically adjusting magnetic saturation characteristics per motor to be controlled and three-phase unbalance characteristics, and realizing high-torque sinusoidal wave drive around zero-speed without the use of a rotor position sensor.

Solution to Problem

A PM motor, in which three-phase stator wirings are in Y connection, is assumed to be driven and is DC-conducted by an inverter before actual operational drive, and a rotor of the PM motor is moved to a predetermined phase and is applied with a pulse-shaped voltage from the inverter at the moved state thereby to acquire a neutral point potential as a potential at Y connection point of the stator wirings. The acquired value is stored in a nonvolatile memory in the controller and a position of the rotor of the PM motor is estimated based on the value, thereby realizing a synchronous motor control apparatus capable of high-torque drive from zero-speed.

Advantageous Effects of Invention

According to the invention disclosed in the present application, the effects acquired by representative inventions will be briefly described as follows.

According to the present invention, a relationship between a neutral point potential of a PM motor and a position of a rotor can be previously acquired, and thus any motor having magnetic circuit characteristics can realize sensorless drive in a low-speed range by a simple adjustment algorithm. Consequently, high-torque drive with less vibration and noise is enabled for the systems published so far. Further, a position can be estimated and calculated by a simple algorithm in an actual operational drive after the adjustment, thereby realizing the sensorless drive by an inexpensive microcomputer.

BRIEF DESCRIPTION OF DRAWINGS

FIGS. 2(a) and 2(b) are diagrams illustrating vector indications of output voltages in an inverter according to the first exemplary embodiment.

FIG. 22 is a diagram illustrating a relationship between a rotor position area and a voltage vector essential in the area according to the sixth exemplary embodiment.

FIG. 23 is a diagram for selecting a necessary voltage instruction correction method based on the rotor position areas and the voltage instruction areas according to the sixth exemplary embodiment.

FIG. 24 is a diagram illustrating a voltage instruction correction method according to the sixth exemplary embodiment.

DESCRIPTION OF EMBODIMENTS

Figure 1:
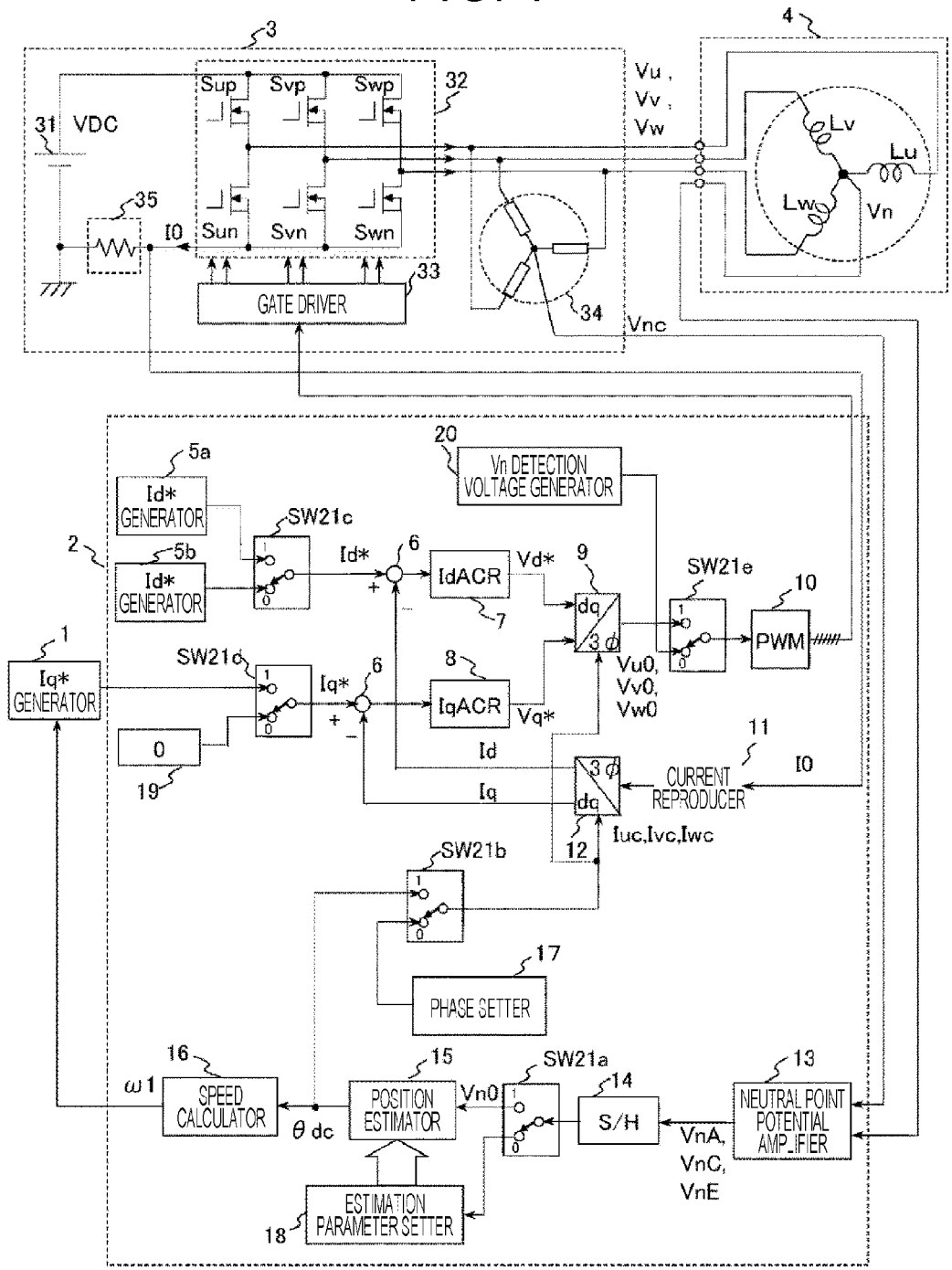
FIG. 1 is a diagram illustrating a configuration of a synchronous motor control apparatus according to a first exemplary embodiment.
Figure 3:
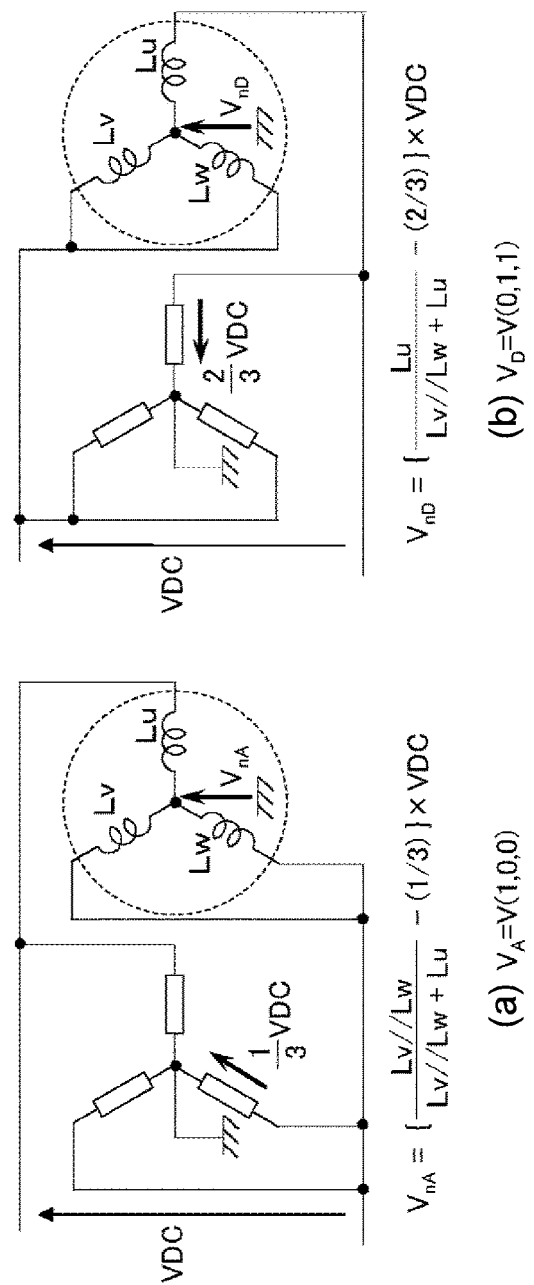
FIGS. 3(a) and 3(b) are diagrams illustrating a neutral point potential generation principle of a PM motor according to the first exemplary embodiment.

Exemplary embodiments of the present invention will be described below.

First Exemplary Embodiment

An AC motor control apparatus according to a first exemplary embodiment of the present invention will be described with reference to FIGS. 1 to 9.

The apparatus is directed for driving a three-phase permanent magnet synchronous motor 4 (which will be denoted as PM motor 4 below), and is generally configured of an Iq* generator 1, a controller 2, an inverter including a DC power supply 31, an inverter main circuit 32, a gate driver 33, a virtual neutral point potential generator 34, and a current detector 35, and a PM motor 4 to be driven.

A PM motor is assumed to be driven according to the present exemplary embodiment, but any motor capable of acquiring magnetic saturation characteristics for a position of a rotor is applicable even if it is of other kind of AC motor.

The Iq* generator 1 is a control block for generating a torque current instruction Iq* of the PM motor 4, and corresponds to a higher-level controller of the controller 2. For example, it functions as a speed controller for controlling a rotation speed of the PM motor 4 or a block for calculating a necessary torque current instruction from a state of a load device such as pump and giving it to the controller 2.

The controller 2 is directed for performing vector control on the PM motor 4 in a rotor position sensorless manner, mounts thereon the functions of both an "actual operation mode" for realizing normal position-sensorless drive and an "adjustment mode" of automatically performing an adjustment work on an individual PM motor before actual operation, and switches the operations by switchers in the block.

The controller 2 is configured of Id* generators 5a and 5b for giving an excitation current instruction Id* to the PM motor 4, a signal adder 6, a d-axis current controller IdACR 7, a q-axis current controller IqACR 8, a dq reverse converter 9 for converting dq-axis voltage instructions Vd* and Vq* into three-phase AC voltage instructions Vu0, Vv0, and Vw0, a pulse width modulator (PWM) 10 for creating a gate pulse signal for driving the inverter 3 based on the three-phase AC voltage instructions, a current reproducer 11 for reproducing three-phase AC currents from a DC bus current of the inverter 3, a dq converter 12 for converting the reproduced three-phase AC currents Iuc, Ivc, and Iwc into the values on the dq coordinate axis as rotor coordinate axis of the PM motor 4, a neutral point potential amplifier 13 for amplifying and detecting a neutral point potential Vn of the PM motor 4 with reference to a virtual neutral point potential Vnc of the virtual neutral point potential generator 34, a sample/holder 14 for sampling/holding an observed neutral point potential and fetching it inside the controller, a position estimator 15 for estimating and calculating a position of the rotor of the PM motor 4 based on the neutral point potential, a speed calculator 16 for estimating a speed of the rotor based on the estimated rotor position θdc, a phase setter 17 for forcibly moving a position of the rotor to a predetermined position in an adjustment mode, an estimation parameter setter 18 for setting a parameter required for estimating a position in an actual operation, a zero generator 19 for giving Iq* (=0) in the adjustment mode, a detection voltage generator 20 for generating a voltage for acquiring a neutral point potential in the adjustment mode, and switchers SW 21a to 21e for switching the actual operation mode and the adjustment mode.

In the actual operation mode, the SW 21a to 21e are switched to the "1" side so that a vector control system using position estimation based on a neutral point potential and dq-axis current control is realized. The parameters required in the position estimator 15 in the actual operation mode are acquired by an algorithm in the adjustment mode described below by switching the SW 21a to 21e to the "0" side.

The switchers SW 21a to 21e perform the following switching. The SW 21a uses an observed neutral point potential for the position estimator 15 during drive in the actual operation mode, and switches a signal to be used for the estimation parameter setter in the adjustment mode. The SW 21b switches a signal to give a converted phase for the dq converter 12 and the dq reverse converter 9 to an estimation phase θdc in the actual operation mode or giving it by the phase setter 17 in the adjustment mode. The SW 21c and 21d switch the current instructions Id* and Iq* during current control. The d-axis current instruction uses the Id* generator 5a in the actual operation mode and a signal from the Id* generator 5b in the adjustment mode. Further, Iq* switches to the SW 21d in order to give a signal of the Iq* generator 1 in the actual operation mode and to give zero in the adjustment mode. The SW 21e switches to give a signal of the Vn detection potential generator in order to detect a necessary neutral point potential in the adjustment mode.

In the control apparatus, a DC bus current is detected by the current detector 35 and a phase current is reproduced by the current reproducer 11 inside the controller 2 so that a phase current of the PM motor 4 is detected, but no failure is caused even by direct use of a phase current sensor. The operations of the current reproducer 11 do not have a direct relation with the characteristic parts of the present controller, and thus a detailed description thereof will be omitted. Further, a neutral point potential Vn of the PM motor 4 is observed with reference to a virtual neutral point potential Vnc of the virtual neutral point potential generator 34, but any reference potential may be taken. Other reference potential such as ground level of the DC power supply 31 in the inverter 3 may be employed for the detection.

The principle of the position-sensorless drive based on neutral point potentials will be described below.

An output voltage of the inverter 3 takes eight patterns in total depending on the switch states of the three-phase switching devices (Sup to Swn). FIG. 2 (a) illustrates the output voltages of the inverter 3 in vectors on the αβ coordinate. Two zero vectors (V(0, 0, 0) and V(1, 1, 1)) and six non-zero vectors ($V_A$ to $V_F$) are the voltage patterns capable of being output by the inverter. The numerical value "1, 0, 0" of V(1, 0, 0) indicates the switch states of the phases U, V, and W of the inverter main circuit, where "1" indicates ON of the upper device and "0" indicates ON of the lower device. That is, V(1, 0, 0) indicates a state in which the phase U is ON in the upper device and the phase V and the phase W are ON in the lower device.

The inverter creates a sinusoidal pulse pattern by use of the eight voltage vectors (including the two zero vectors). For example, assuming that a voltage instruction V* is in the area (3) in FIG. 2 (a), the vectors $V_B$ and $V_C$ surrounding the same and the zero vectors are combined thereby to create a voltage corresponding to V*.

A relationship with a position θd of the rotor of the PM motor 4 is as illustrated in FIG. 2 (b). Generally, θd is defined in the counterclockwise direction with reference to the α axis (matching with a U-phase stator wiring position).

Changes in neutral point potentials relative to the voltage vectors will be described below. FIGS. 3(a) and 3(b) illustrate the neutral point potentials $V_{nA}$ and $V_{nD}$ when the voltage vectors $V_A$ and $V_D$ are applied by way of example. In the following, $V_{nA}$, $V_{nB}$, $V_{nC}$, $V_{nD}$, $V_{nE}$, and $V_{nF}$ are employed as the names of a neutral point potential, and these indicate neutral point potentials caused when the voltage vectors $V_A$, $V_B$, $V_C$, $V_D$, $V_E$, and $V_F$ are applied, respectively.

Figure 4:
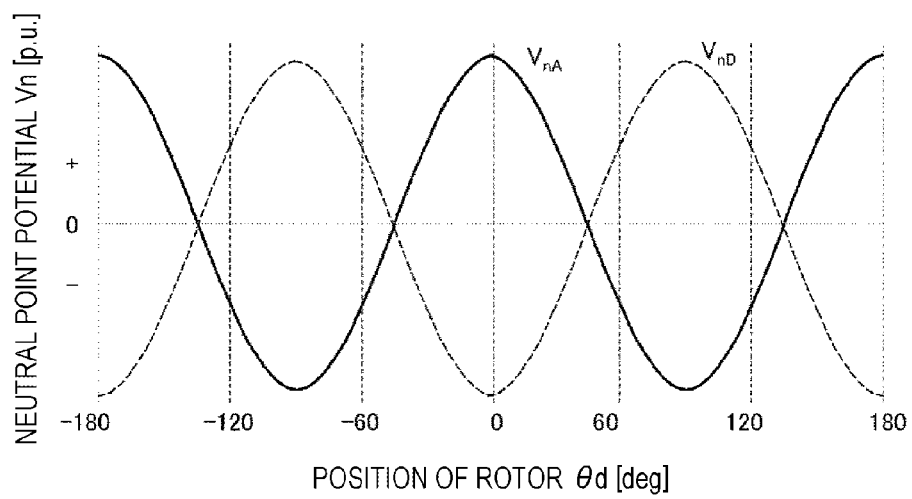
FIG. 4 is a waveform diagram of actually-measured neutral point potentials according to the first exemplary embodiment by way of example.
Figure 5:
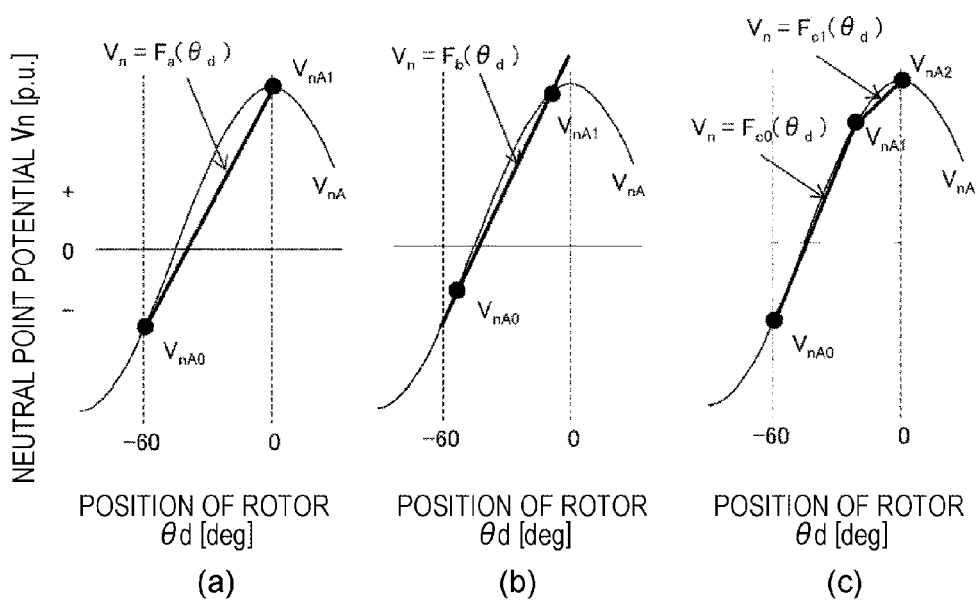
FIGS. 5(a) to 5(c) are waveform diagrams for linearization of a neutral point potential according to the first exemplary embodiment.

As illustrated in FIGS. 3(a) and 3(b), each neutral point potential is observed as a partial potential of a stator wiring $L_u$, $L_v$ or $L_w$. If the inductances of the respective wirings are equal to each other, a neutral point potential completely reaches zero. However, actually a magnetic flux of the rotor influences the wiring, and thus the inductance changes depending on a position of the rotor. FIG. 4 illustrates a result that a neutral point potential is observed by applying a voltage vector to the actual PM motor. Both $V_{nA}$ and $V_{nD}$ indicate a change depending on a position of the rotor. A position of the rotor can be estimated by use of the dependence of a neutral point potential depending on a position of the rotor (PTLs 3 and 4).

According to the present invention, a position of the rotor is estimated and calculated by use of part of the waveform of FIG. 4.

FIGS. 5(a), 5(b), and 5(c) illustrate linearization in terms of a change in $V_{nA}$ of FIG. 4 by way of example. For example, a change of $V_{nA}$ from −60 [deg] to 0 [deg] is regarded as linear and is expressed in a function of $V_n = F_a (\theta_d)$ (FIG. 4 (a)). In this case, its inverse function of $\theta_d = F_a^{-1}(V_n)$ is used for estimating a position, thereby estimating a position $\theta_d$ of the rotor from $V_n$.

In order to realize the above, two neutral point potentials for $\theta_d$ have only to be acquired. For example, the rotor is moved to −60 [deg] and $V_A$ is applied at the position thereby to acquire a neutral point potential $V_{nA0}$, and further the rotor is moved to a position of 0 [deg] and $V_A$ is applied thereby to acquire a neutral point potential $V_{nA1}$. When the linearization is approximated in the range of −60 [deg] to 0 [deg] as illustrated in FIG. 5(b), a degree of approximation changes but a position can be estimated in principle. Further, as illustrated in FIG. 5(c), a plurality of points may be acquired in the range of 60 [deg] thereby to enhance accuracy.

Figure 6:
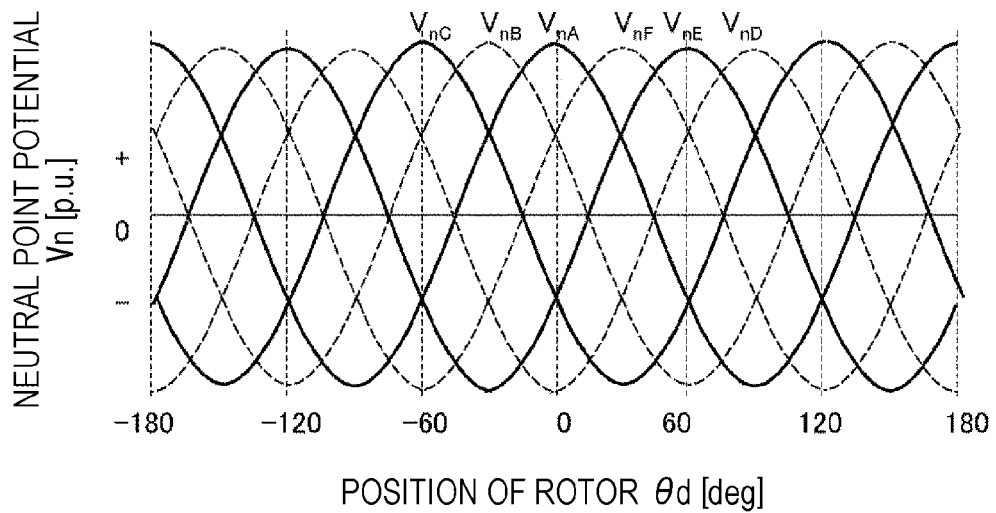
FIG. 6 is a waveform diagram illustrating changes in all kinds of neutral point potentials according to the first exemplary embodiment.
Figure 7:
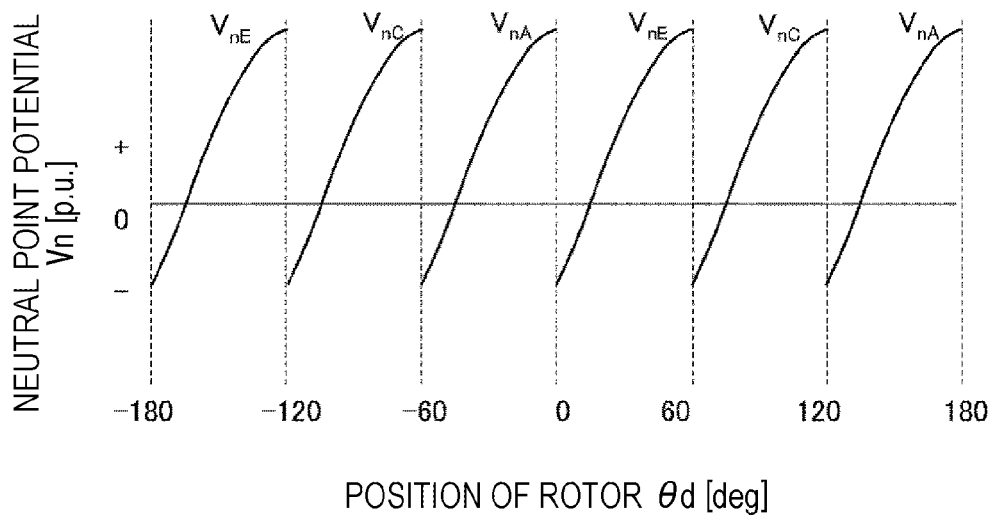
FIG. 7 is a waveform diagram illustrating changes in neutral point potentials used for sensorless drive according to the first exemplary embodiment.

There are six voltage vectors capable of being output by the inverter 3 except zero, and thus six neutral point potentials can be actually observed. Exemplary observation results are illustrated in FIG. 6. A waveform of FIG. 7 is obtained when the six neutral point potentials are selected and used per 60 degrees of a position of the rotor. As illustrated in FIG. 7, three neutral point potentials $V_{nA}$, $V_{nC}$, and $V_{nE}$ are used per 60 degrees in turn, thereby observing a symmetrical waveform and estimating a position of the rotor by a simpler algorithm.

Figure 8:
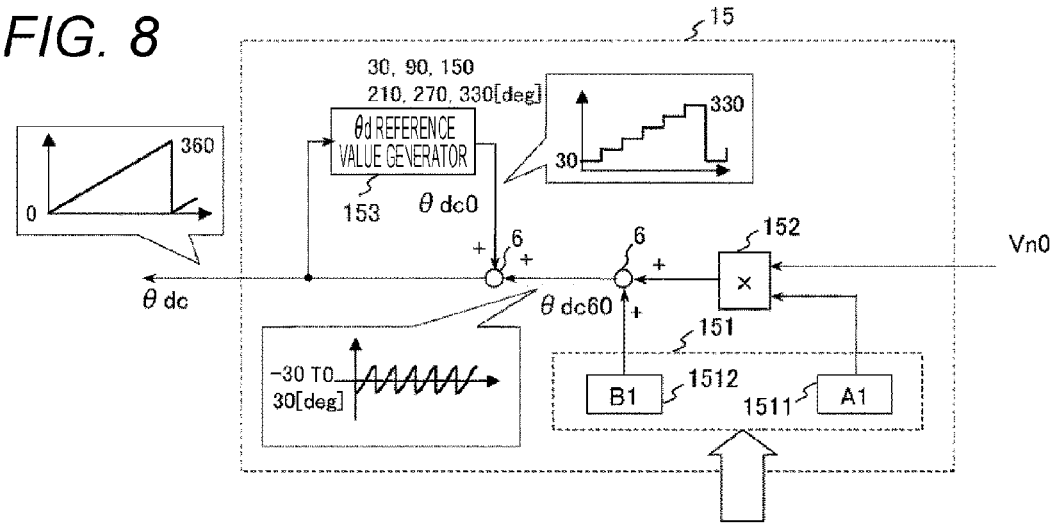
FIG. 8 is a block configuration diagram of a position estimator according to the first exemplary embodiment.

FIG. 8 is a block diagram illustrating a configuration of the position estimator 15 operating in the actual operation mode.

The neutral point potential $V_{n0}$ (actually any of $V_{nA}$, $V_{nC}$, and $V_{nE}$) is input, and $$\theta_{dc60} = A_1 \cdot V_{n0} + B_1 \qquad \text{(Math. 1)}$$

is calculated by use of a multiplier 152 and the adder 6. The linear function parameters $A_1$ and $B_1$ use the values previously set in the adjustment mode. $\theta_{dc60}$ is set to be calculated in the range of ±30 [deg], and is added with a staircase wave signal $\theta_{dc0}$ per 60 degrees output by a $\theta_d$ reference value generator 153 thereby to acquire an estimated phases $\theta_{dc}$ in 0 to 360 [deg].

Estimation and calculation of a position of the rotor can be realized in a remarkably simple manner by the above position estimation algorithm, and at this time, the setting of the parameters $A_1$ and $B_1$ in (Math. 1) is important.

For the function in (Math. 1), as illustrated in FIG. 5(a), a neutral point potential may be observed by moving a position of the rotor to a predetermined phase, but it takes much time to manually perform it and it is desirable to automate it.

Figure 9:
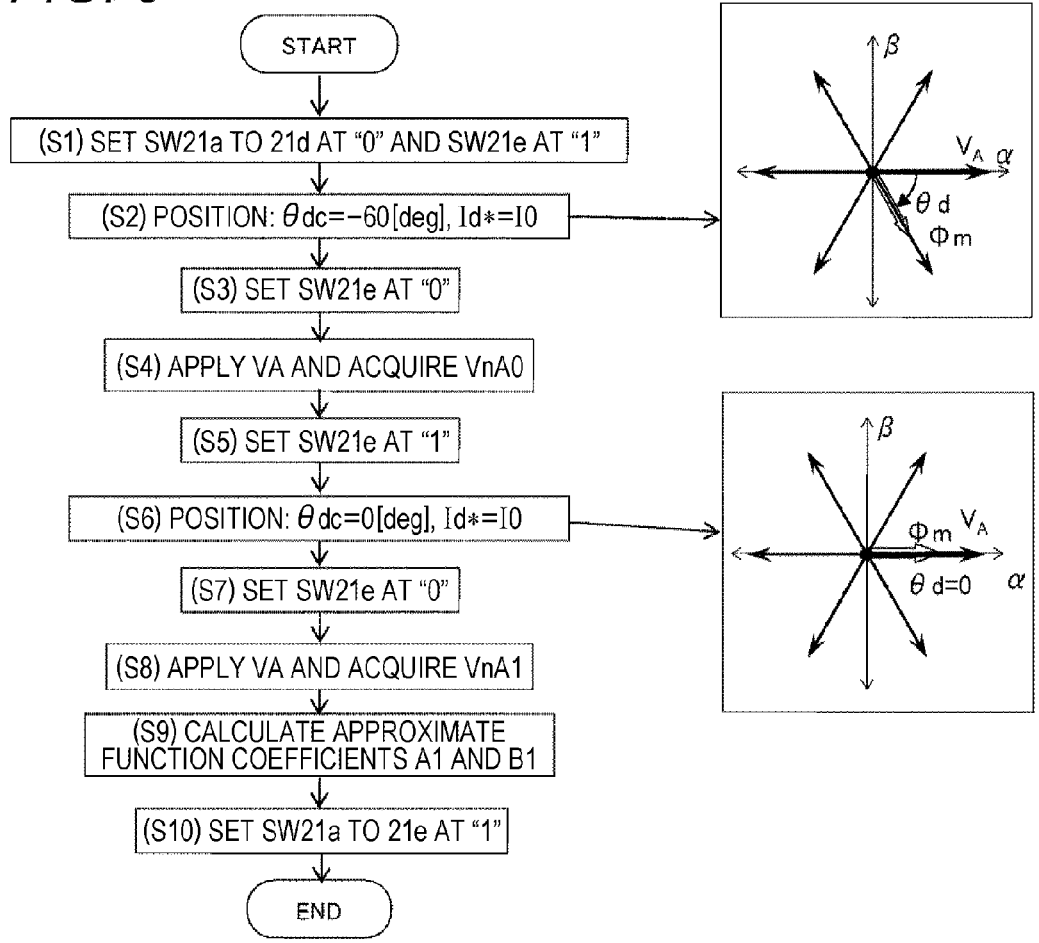
FIG. 9 is a flowchart illustrating an algorithm in an adjustment mode according to the first exemplary embodiment.

FIG. 9 illustrates an algorithm in the adjustment mode for acquiring $V_{nA0}$ and $V_{nA1}$ illustrated in FIG. 5(a). In FIG. 9, in (S1), the SW 21a to 21d are set on the "0" side and only the SW 21e remains on the "1" side. Then in (S2), $\theta_{dc} = -60$ [deg] is output in the phase setter 17, and at the same time, output of the Id* generator 5b is set at $I_0$. $I_0$ is assumed as current value required for moving the rotor, and may be equivalent to a rated current of the PM motor 4. A DC current is generated at the position of $\theta_{dc} = -60$ [deg] by the setting in (S2). The rotor is attracted to the current to move, and stops at the position of $\theta_{dc} = -60$ [deg]. Then in (S3), the SW 21e is switched to "0." At this time, the DC current is temporarily interrupted. Then in (S4), the voltage vector $V_A$ is output from the $V_n$ detection voltage generator 20 thereby to acquire the neutral point potential $V_{nA}$. $V_{nA}$ matches with $V_{nA0}$ in FIG. 5(a) since the position $\theta_d$ of the rotor is at −60 [deg]. Similarly, $V_{nA1}$ is acquired in the processing of (S5) to (S8). Consequently, the relationship between a neutral point potential and a position of the rotor can be linearly approximated thereby to find two coefficients $A_1$ and $B_1$ required for the linearization in (S9). The coefficients are calculated by the estimation parameter setter 18, and are set in a parameter setter 151 of the position estimator 15. The adjustment mode ends and is switched to the actual operation mode in (S10) to be terminated.

As described above, according to the exemplary embodiment of the present invention, the parameters required for position-sensorless drive can be automatically adjusted easily by use of any PM motor, thereby realizing sensorless drive of a common PM motor.

Second Exemplary Embodiment

Figure 11:
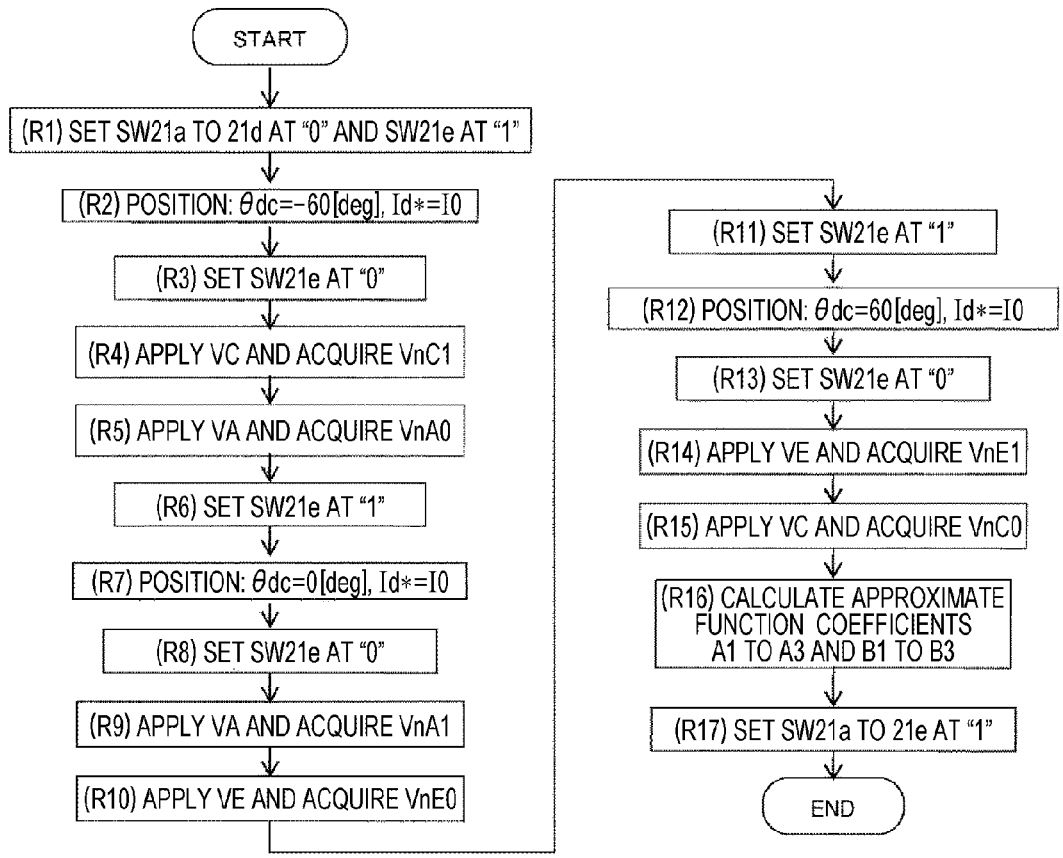
FIG. 11 is a flowchart illustrating an algorithm in an adjustment mode according to the second exemplary embodiment.
Figure 12:
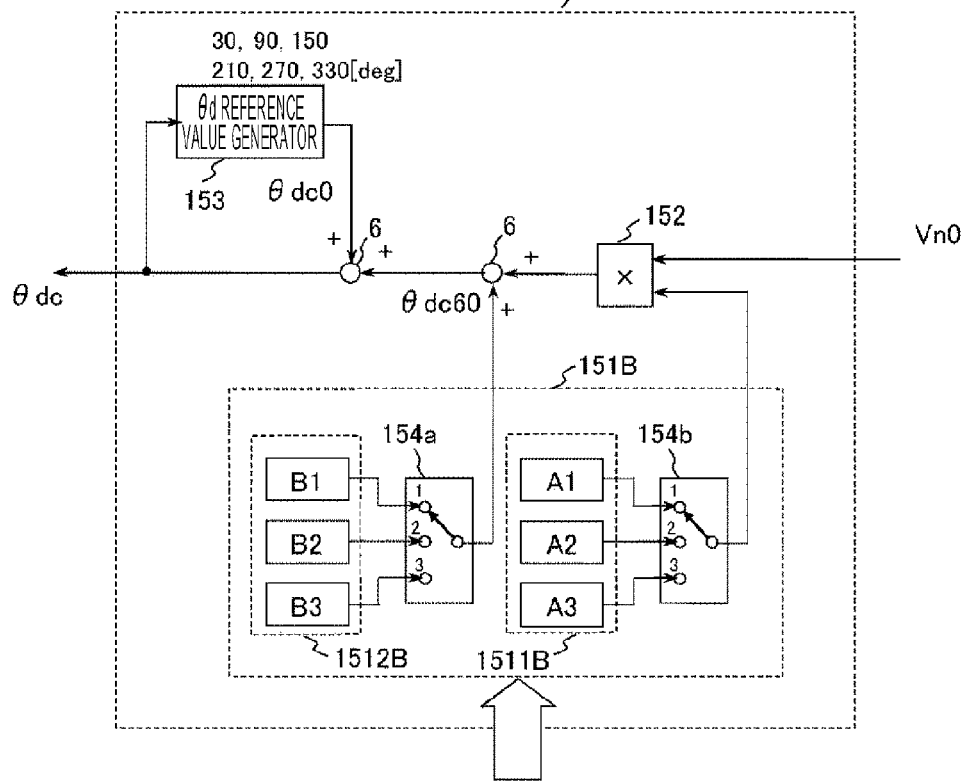
FIG. 12 is a block configuration diagram of a position estimator according to the second exemplary embodiment.

A synchronous motor control apparatus according to a second exemplary embodiment of the present invention will be described below with reference to FIGS. 10, 11, and 12.

According to the first exemplary embodiment, there has been described that a simple adjustment algorithm can be applied to a PM motor with unknown characteristics. According to the second exemplary embodiment, there will be described a means for solving the problem of three-phase unbalance in an individual PM motor.

According to the first exemplary embodiment, the adjustment algorithm is configured assuming that a neutral point potential relative to each voltage vector equally changes as illustrated in FIG. 7, for example, for the neutral point potential detection characteristics. However, three-phase unbalance may be caused in an actual PM motor due to a variation in manufacture error or material. In particular, the neutral point potentials used in the present invention are directed for detecting an effect of a slight change in inductance in each phase, which is sensitive to the effects of unbalance.

Figure 10:
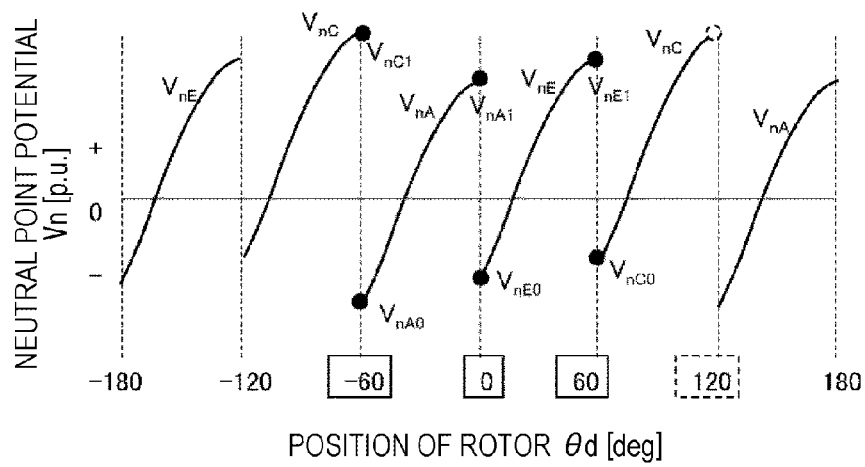
FIG. 10 is a waveform diagram illustrating variations in neutral point potentials used for sensorless drive according to a second exemplary embodiment.

FIG. 10 illustrates the results of the measured neutral point potentials in a PM motor. $V_{nA}$, $V_{nC}$, and $V_{nE}$ indicate different changes, respectively. These include an effect due to three-phase unbalance in the motor itself and an effect due to a variation in the neutral point potential detection circuit (the virtual neutral point generator 34 in FIG. 1). However, according to the first exemplary embodiment, the variations in the respective phases cannot be compensated in the adjustment mode.

According to the present exemplary embodiment, the adjustment work is performed on each of the three neutral point potentials in order to solve the problem. The algorithm therefor is illustrated in FIG. 11. In FIG. 11, a position of the rotor is moved to −60 degrees in the processing in (R1) to (R5) thereby to acquire $V_{nC1}$ and $V_{nA0}$ in FIG. 10. Similarly, a position of the rotor is moved to 0 [deg] in (R6) to (R10) thereby to acquire $V_{nA1}$ and $V_{nE0}$, and finally a position of the rotor is moved to 60 [deg] thereby to acquire $V_{nE1}$ and $V_{nC0}$ in (R11) to (R15). During this period, a position of the rotor moves to the three positions (−60, 0, and 60 [deg]). The approximate function parameters $A_1$ to $A_3$ and $B_1$ to $B_3$ in the respective 60-degree periods are calculated by the neutral point potentials in (R16).

The resultant parameters are set in a phase estimator 15B (FIG. 12) according to the present exemplary embodiment. A parameter setter 151B switches the parameters A1, A2, A3 and B1, B2, B3 depending on a period thereby to calculate $\theta_{dc60}$. Consequently, the variations in the three phases are compensated, thereby calculating an accurate value of the rotor phase $\theta_{dc}$.

Third Exemplary Embodiment

A synchronous motor control apparatus according to a third exemplary embodiment of the present invention will be described below with reference to FIGS. 13(a), 13(b) and 14.

According to the first and second exemplary embodiments, for the rotor phases, an electric angle of 360 degrees is divided by 60 degrees thereby to estimate a position with reference to zero. However, a waveform of a neutral point potential to be detected is not symmetrical in each 60-degree period, and is large in error for linear approximation. Of course, as illustrated in FIG. 5(c), some reference points may be acquired thereby to make broken line approximation, but the processing is complicated and an operation time in the adjustment mode may be longer.

The third exemplary embodiment of the present invention solves the problem.

Figure 13:
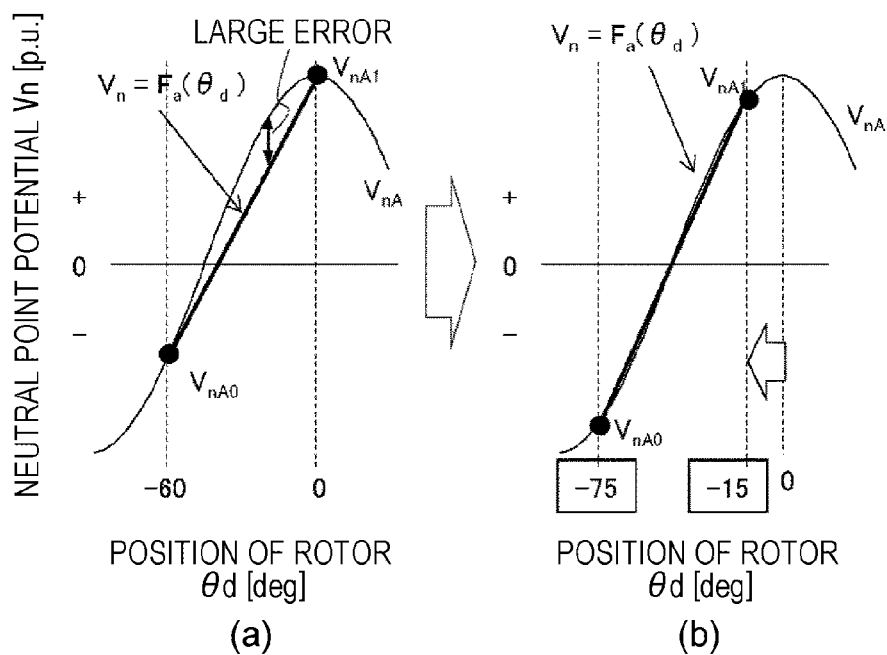
FIGS. 13(a) and 13(b) are waveform diagrams for linearization of a neutral point potential according to a third exemplary embodiment.

FIG. 13(a) illustrates the principle of the above exemplary embodiments, and FIG. 13(b) illustrates the principle of the present exemplary embodiment. For example, when a 60-degree period for detecting $V_{nA}$ is set in the range of −60 to 0 degrees, a large error is partially caused. According to the present exemplary embodiment, the period is shifted by 15 degrees as illustrated in FIG. 13(b) thereby to make linearization in the range of −75 to −15 degrees. Then, $V_{nA}$ to be detected has a symmetrical waveform, and an error on linear approximation is largely reduced.

Figure 14:
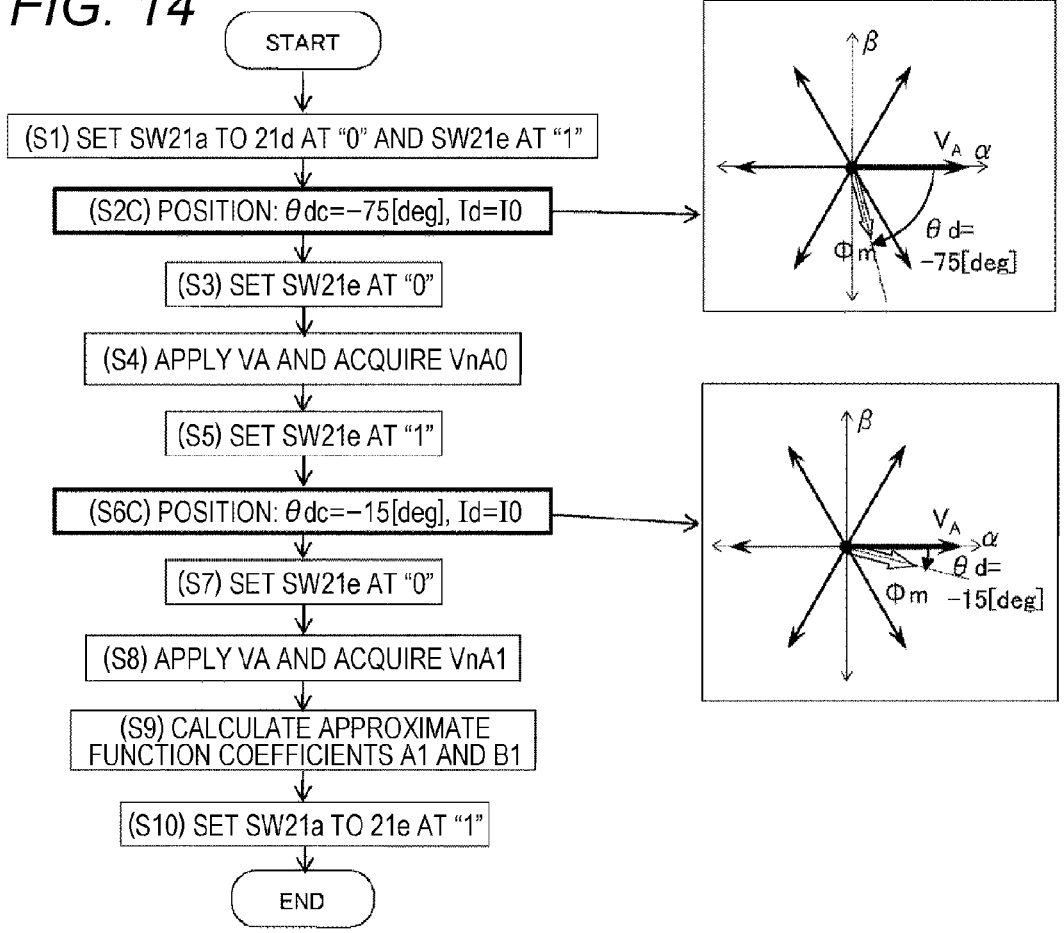
FIG. 14 is a flowchart illustrating an algorithm in an adjustment mode according to the third exemplary embodiment.

The algorithm in the adjustment mode in the system is illustrated in FIG. 14. FIG. 14 illustrates the algorithm in association with the algorithm (FIG. 9) according to the first exemplary embodiment. (S2) and (S6) in FIG. 9 are changed to (S2C) and (S6C) in FIG. 14. In FIG. 14, a position to which the rotor is to be moved is changed to −75 [deg] and −15 [deg], and a neutral point potential $V_{nA}$ is acquired at the respective positions thereby to finally calculate the parameters $A_1$ and $B_1$.

A reference value of the θd reference generator in the phase estimator 15 needs to be shifted by 15 degrees in the actual operation mode, but it is not a large change.

A position of the rotor in the adjustment mode is shifted by 15 degrees as described above thereby to realize sensorless drive capable of estimating a position with higher accuracy. When a movement position of the rotor is entirely shifted by 15 degrees in the adjustment mode according to the second exemplary embodiment, sensorless drive can be exactly performed for three-phase unbalance.

Fourth Exemplary Embodiment

Figure 15:
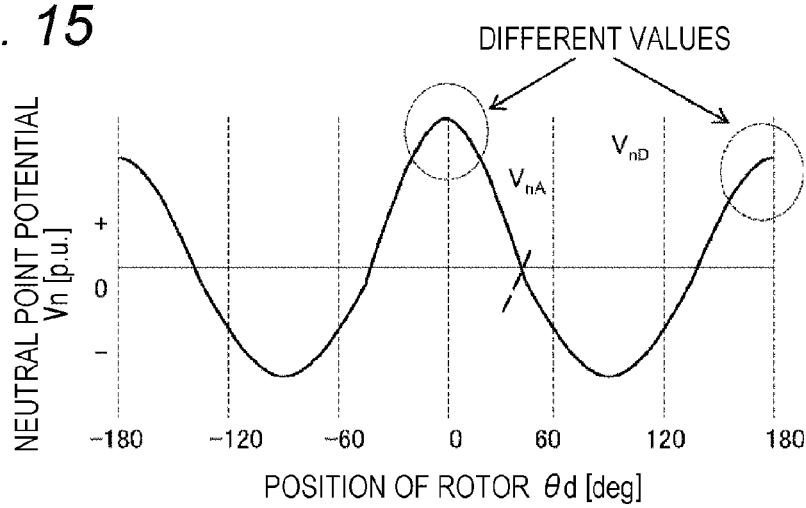
FIG. 15 is a waveform diagram of actually-measured neutral point potentials according to a fourth exemplary embodiment by way of example.
Figure 16:
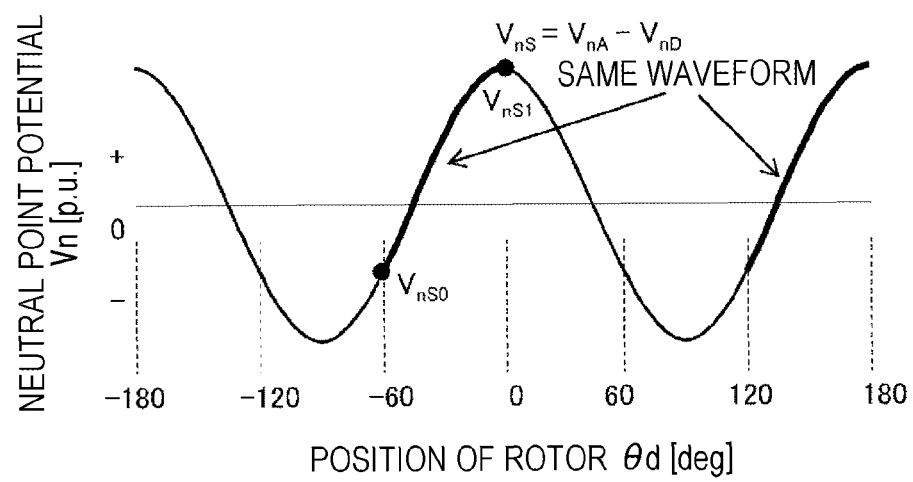
FIG. 16 is a waveform diagram of combination of two neutral point potentials according to the fourth exemplary embodiment.

A synchronous motor control apparatus according to a fourth exemplary embodiment of the present invention will be described below with reference to FIGS. 15, 16, and 17.

The present invention is directed for sensorless drive based on neutral point potentials in the PM motor, but a dependence of the neutral point potentials on a position of the rotor is the most important factor.

Basically, the control system is configured assuming that a neutral point potential changes at a double cycle relative to the rotor phase $\theta_d$ as illustrated in FIG. 4. However, a PM motor may be such that a change in neutral point potential is not symmetrical. Byway of example, there is a PM motor which has the characteristics of $V_{nA}$ and $V_{nD}$ as illustrated in FIG. 15. It can be seen that a value of $V_{nA}$ is different between around 0 degrees and around 180 degrees. Further, a peak value lowers around 90 degrees and −90 degrees. This phenomenon is easily caused in a PM motor with higher power density. A motor with high power density has a high density of magnetic flux, and is strongly influenced by a permanent magnetic flux. In FIG. 15, a current is generated in a direction in which $V_A$ strengthens the magnetic flux around 0 degrees and a current is generated in a direction in which $V_A$ cancels the magnetic flux around 180 degrees. Consequently, the illustrated waveform is caused depending on a direction in which magnetic saturation is promoted or a direction in which it is alleviated.

When the above exemplary embodiments are applied to a motor with such characteristics, an estimation result is different between −60 to 0 degrees and 120 to 180 degrees and a distortion is caused in the current waveform, which may be a cause of torque pulsation.

Therefore, two voltage vectors ($V_A$ and $V_D$ in FIG. 15) in different directions are applied in turn according to the fourth exemplary embodiment. At this time, $V_A$ and $V_D$ are the voltage vectors in the completely-inverted switch states, and the pulse voltages in the reverse directions are applied to the PM motor. Both the neutral point potentials $V_{nA}$ and $V_{nD}$ acquired by the applied $V_A$ and $V_D$ are used to calculate (Math. 2).

$$V_{nS}=V_{nA}-V_{nB} \qquad \text{(Math. 2)}$$

Position estimation is made assuming a new variable $V_{nS}$ acquired in (Math. 2) as neutral point potential. $V_{nA}$ and $V_{nD}$ are symmetrical and thus $V_{nS}$ takes a symmetrical waveform as illustrated in FIG. 16. In FIG. 16, the waveforms around 0 degrees and 180 degrees are completely symmetrical, and thus the above problem is solved.

Figure 17:
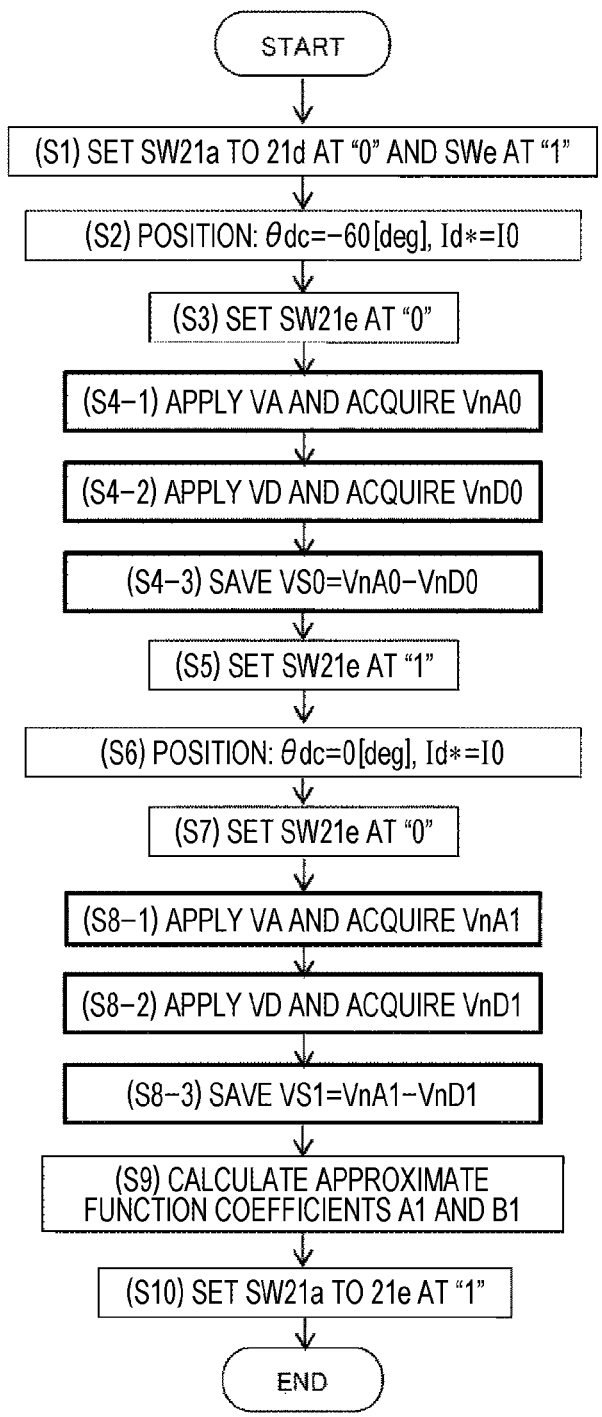
FIG. 17 is a flowchart illustrating an algorithm in an adjustment mode according to the fourth exemplary embodiment.

FIG. 17 illustrates an algorithm in the adjustment mode according to the present exemplary embodiment. FIG. 17 is different from FIG. 9 in that (S4) and (S8) in FIG. 9 are changed to (S4-1) to (S4-3) and (S8-1) to (S8-3) in FIG. 17, respectively, and two voltage vectors $V_A$ and $V_D$ are applied thereby to find $V_{nS0}$ and $V_{nS1}$. To the contrary, the estimation parameters $A_1$ and $B_1$ are found thereby to make position estimation in the actual operation mode. On the position estimation, $V_A$ and $V_D$ are alternately applied and $V_{nS}$ is used as neutral point potential.

As described above, according to the fourth exemplary embodiment of the present invention, position estimation can be made with high accuracy even on a PM motor with high power density in which the neutral point potentials are asymmetrical.

There is no problem with applying the present exemplary embodiment to the methods according to the second and third exemplary embodiments such as method for shifting a detection phase by 15 degrees for the problem of three-phase unbalance or enhancement in accuracy.

Fifth Exemplary Embodiment

A synchronous motor control apparatus according to a fifth exemplary embodiment of the present invention will be described below with reference to FIG. 18.

As described above according to the exemplary embodiments, neutral point potentials in a predetermined phase are acquired in the adjustment mode thereby to drive the PM motor with high response and high quality (such as low torque pulsation or low loss). However, the adjustment mode is operated only once as an initial work when the motor is combined with the controller, and thus cannot cope with a temporal change in motor characteristics. The PM motor less changes over time in principle, but a temperature of the motor may change from several tens degrees to about 100 degrees during its driving. The characteristics of the permanent magnet attached on the rotor can change due to a change in temperature, and consequently the neutral point potentials can vary. In particular, the adjustment mode is a one-time operation mode, and an adjustment is likely to be made at a low temperature of the PM motor. On the other hand, when the PM motor is driven in the actual operation mode, the motor main body generates heat due to copper loss or iron loss, and can have the different characteristics from those in the adjustment mode.

Thus, a neutral point potential is detected in the adjustment mode under as close a condition to the temperature condition in the actual operation mode as possible.

Figure 18:
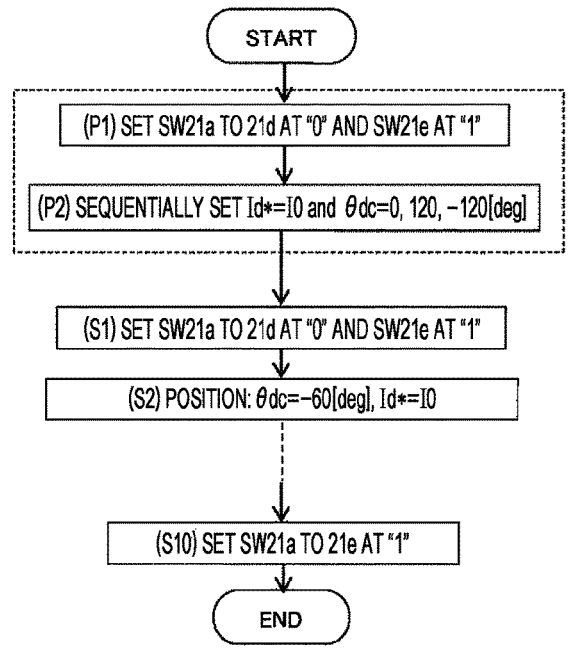
FIG. 18 is a flowchart illustrating an algorithm in an adjustment mode according to a fifth exemplary embodiment.
Figure 19:
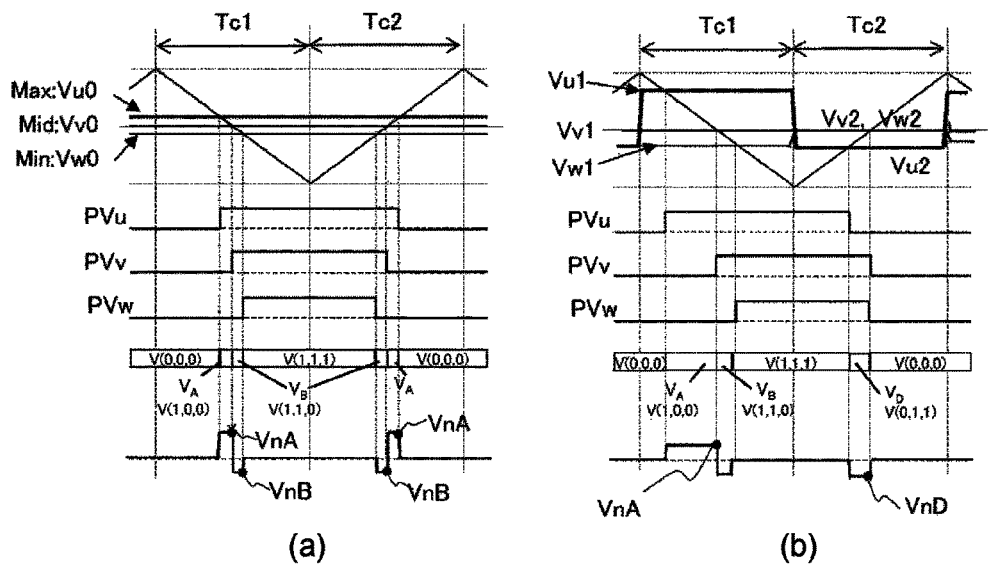
FIGS. 19(a) and 19(b) are waveform diagrams illustrating a PWM pulse waveform creation principle according to a sixth exemplary embodiment.

Thus, as illustrated in FIG. 18, the new processing (P1) and (P2) are added to the algorithm (FIG. 9) in the adjustment mode according to the first exemplary embodiment. In (P1), the SW 21a to 21d are temporarily set in the adjustment mode, and in (P2), $I_0$ is changed to a predetermined value and the phase $\theta_{dc}$ is changed to 0, 120, −120 [deg] in this order thereby to conduct the PM motor 4. The current conduction in (P2) is directed for flowing a current thereby to cause a loss in the PM motor 4, and increasing a temperature of the motor up to a value close to that in the actual operation, and any conductive pattern may be possible. However, it is better that a conducted phase is changed in order to prevent a current from concentrating in a specific phase.

After the PM motor 4 is conducted in (P2), if the adjustment mode indicated in the above exemplary embodiments is operated, a neutral point potential can be acquired under a condition close to the temperature condition in the actual operation.

As described above, according to the fifth exemplary embodiment of the present invention, a neutral point potential under a condition close to the actual operation temperature condition can be acquired in the adjustment mode, thereby enhancing an accuracy of position estimation during actual driving.

Sixth Exemplary Embodiment

A synchronous motor control apparatus according to a sixth exemplary embodiment of the present invention will be described below with reference to FIGS. 19(a) and 19(b) to 24.

According to the third exemplary embodiment, there has been described above that it is advantageous to shift a neutral point potential used for position estimation by 15 degrees with reference to $\theta_d$ in order to keep linearization. Further, according to the fourth exemplary embodiment, there has been described above that two neutral point potentials are detected to make position estimation by use of a difference therebetween, thereby further enhancing accuracy.

The operations need to be realized in the controller also in the actual operation mode, and a specific method therefor will be described according to the sixth exemplary embodiment.

FIGS. 19(a) and 19(b) are principle diagrams illustrating how to create a PWM pulse in the pulse width modulation generator 10 in the controller 2. Assuming a fall period of a triangle wave carrier as Tc1 and a rise period thereof as Tc2, the triangle wave carrier is compared with three-phase voltage instructions $V_{u0}$, $V_{v0}$, and $V_{w0}$ so that PWM pulse trains $PV_U$, $PV_V$, and $PV_W$ are generated. The three-phase voltage instructions change in a sinusoidal shape, but can be regarded as constant for the triangle wave carrier cycle as illustrated.

For general PWM (FIG. 19(a)), the three-phase voltage instructions are assigned to any of the maximum phase (Max), the middle phase (Mid), and the minimum phase (Min). As illustrated in FIG. 19(a), when a relationship of $V_{u0}>V_{v0}>V_{w0}$ is established, the voltage vectors to be output are assumed as $V_A$ and $V_B$ except zero vector. Thus, if a neutral point potential is sampled when $V_A$ and $V_B$ are output, the neutral point potentials VnA and VnB can be acquired. In this way, PTL 4 describes that it is an excellent feature to acquire two neutral point potentials by general PWM waveform. PTL 4 further describes that if two neutral point potentials are acquired, a phase of the rotor can be estimated and calculated in simple computations (such as coordinate transformation and arc tangent operation).

However, in order to detect a neutral point potential at any timing within half a carrier cycle (Tc1 period or Tc2 period), the controller needs to comprise a function capable of realizing the detection. Specifically, only a 32-bit sophisticated macro-processor has the function. Further, even a simple processing such as arc tangent or coordinate transformation is difficult to perform in an inexpensive microcomputer (requires a processing time).

Further, in PTL 4, a variation in characteristics of the motor, particularly three-phase unbalance cannot be addressed and a motor constant is not required, while a variation in motor constant cannot be addressed.

A method for solving the problem will be described according to the present exemplary embodiment.

As described according to the fourth exemplary embodiment, it is advantageous that neutral point potentials for two mutually-reverse voltage vectors are detected thereby to take a difference therebetween. Thus, an original voltage instruction is corrected thereby to forcibly output a desired voltage vector.

FIG. 19(b) illustrates exemplary waveforms of pulse shift. The U-phase voltage instruction $V_{u0}$ is increased in the Tc1 period (the correction result is $V_{u1}$), and is accordingly decreased in the Tc2 period ($V_{u2}$). The increase in the Tc1 period is decreased in the Tc2 period, and a mean value therebetween is corrected to match with the original $V_{u0}$. Further, a common DC bias is added to the three-phase instructions such that the mid phase (Mid) is zero ("a DC bias common in three phases" is a zero phase component for the motor and thus does not influence the motor).

As a result of the correction as illustrated in FIG. 19(b), a PWM pulse to be output is shifted in its phase, and not only $V_A$ but also the reverse voltage $V_D$ is output. Further, the neutral point potentials may be sampled when the carrier wave crosses with zero in order to detect $V_{nA}$ and $V_{nD}$. Further, the neutral point potentials have only to be detected once in the Tc1 period and the Tc2 period, and sampling does not need to be performed twice at predetermined timings within half a carrier cycle unlike in PTL 4, and a sophisticated controller (microcomputer) is not required, thereby realizing the sampling by an inexpensive microcomputer.

Figure 20:
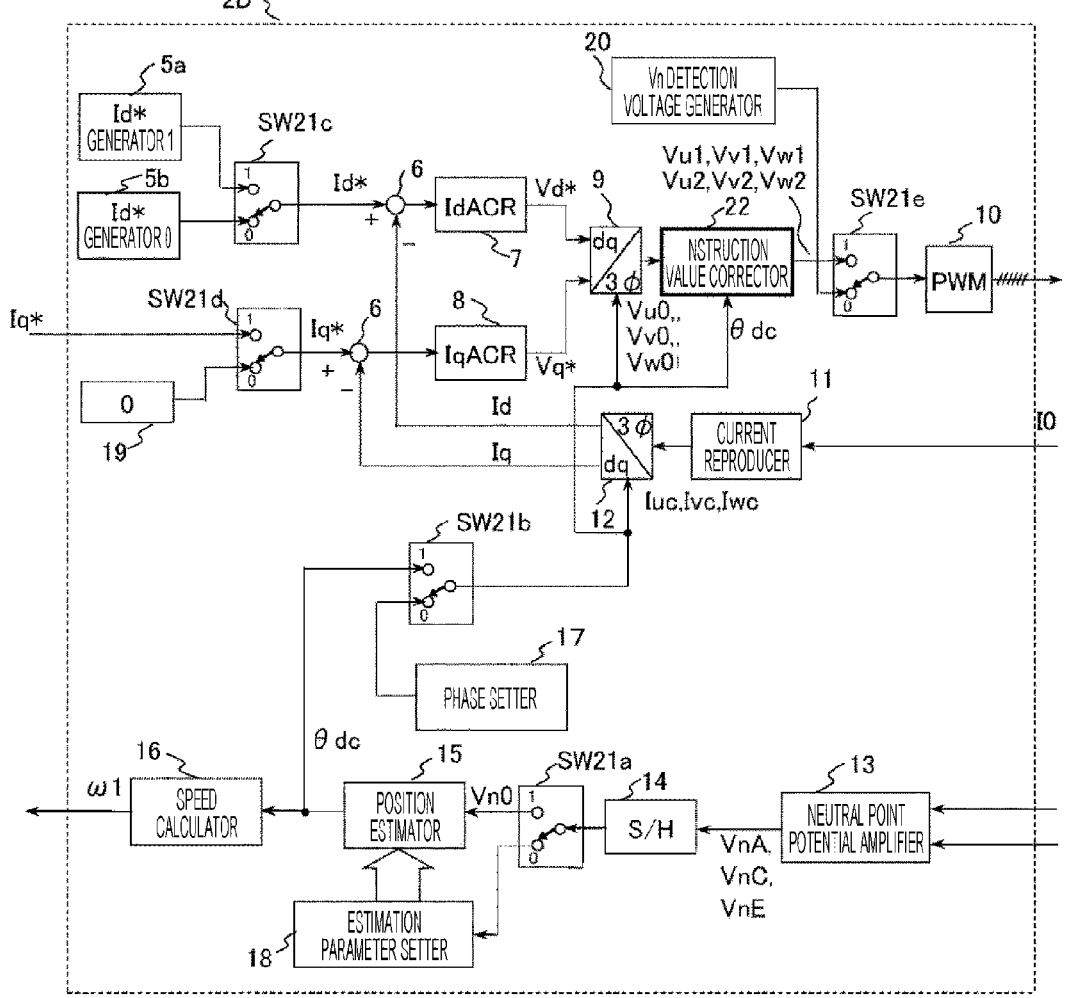
FIG. 20 is a block configuration diagram of a controller according to the sixth exemplary embodiment.
Figure 21:
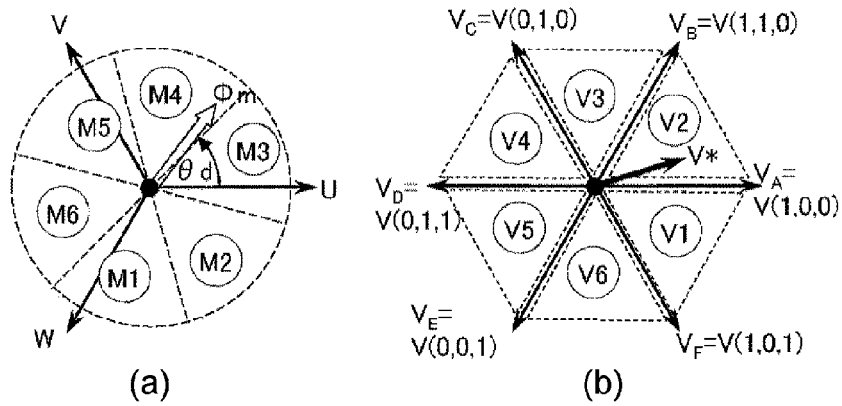
FIGS. 21(a) and 21(b) are vector diagrams illustrating rotor position areas according to the sixth exemplary embodiment.

FIG. 20 is a block configuration diagram of a controller 2D for realizing pulse shift. In the Figure, almost all the components are the same as in the controller 2 in FIG. 1, and an instruction value corrector 22 is newly added. The instruction value corrector 22 corrects the three-phase voltage instructions Vu0, Vv0, and Vw0 into the Tc1 period and the Tc2 period, and outputs the instruction voltages as Vu1, Vv1, Vw1 and Vu2, Vv2, Vw2.

A specific pulse shift method will be described below.

FIG. 21(a) illustrates a position of the rotor (position of magnetic flux Φm) divided into six areas, where M1 is in the range of 225<θd<285 [deg] and M2 is in the range of 285<θd 345 [deg], for example. The definition is made in consideration of linearization of neutral point potentials as described according to the third exemplary embodiment (shifted by 15 degrees). Further, the voltage instructions V* can be divided into six areas V1 to V6 as in FIG. 21(b). The voltage instructions V* denotes the three-phase voltage instructions on the αβ axis, and for example when V* is present in the area V2 as illustrated, V* is output by use of the voltage vectors $V_A$, $V_B$, and the zero vector positioned on the vertices of the triangle as the area V2 in principle.

Herein, it is important that the position areas M1 to M6 of the rotor and the areas V1 to V6 of an applied voltage to the motor independently change. In principle, a speed induced voltage is generated orthogonal to a position of the rotor, and thus if a position of the rotor is defined, a voltage to be output should be almost uniquely defined. However, an induced voltage is low in a low-speed range and a voltage instruction transiently changes in various directions so that pulse shift needs to be performed under any condition.

FIG. 22 illustrates the position areas M1 to M6 of the rotor and two voltage vectors required for detecting a neutral point potential in each area. That is, when a position area (any of M1 to M6) of the rotor is specified, two voltage vectors illustrated in FIG. 22 should be output for any value of the voltage instruction. Thus, pulse shift needs to be performed on the original voltage instructions such that the voltage vectors for detection are surely output.

A method for realizing such pulse shift is illustrated in FIG. 23 and FIG. 24. The horizontal axis in FIG. 23 indicates a position area of the rotor and the vertical axis indicates a voltage area. In FIG. 23, when a position area of the rotor and a voltage area are specified, a voltage instruction correction method [A], [B], or [C] required therefor is determined. The voltage correction methods [A], [B], and [C] are specifically illustrated in FIG. 24. The original three-phase voltage instructions are assigned to the maximum phase (Max), the middle phase (Mid), and the minimum phase (Min), and the respective instructions are corrected as in FIG. 24, thereby outputting the required voltage vectors. "Vsh" in FIG. 24 indicates a voltage value corresponding to a voltage vector for detecting Vn, and when the value is set to be higher, an output period of the voltage vector for detection is longer.

Further, in FIG. 24, in the corrections [A] and [B], the middle phase Mid is not corrected, and the maximum phase Max and the minimum phase Min are corrected. In the correction [C], the maximum phase Max is not corrected, and the middle phase Mid and the minimum phase Min are corrected. A timing to sample a neutral point potential matches with a timing when the corrected middle phases Mid1 and Mid2 contact a triangle wave carrier in [A] and [B] and a timing when the maximum phases Max1 and Max2 contact a triangle wave carrier in [C].

The voltage instructions are corrected by the corrections [A], [B], and [C] but a carrier frequency does not change so that the number of times of switching does not increase or decrease. That is, the present exemplary embodiment has a great merit that a desired voltage pulse can be applied without increasing switching loss or the like of the inverter.

A specific method therefor will be described below.

A position area of the rotor can be determined based on a phase angle $\theta_{dc}$ at the time in the controller. Further, a voltage area can be specified by comparing the voltage instructions $V_{u0}$, $V_{v0}$, and $V_{w0}$ after dq reverse conversion. For example, when a position area of the rotor is M1 and the three-phase AC voltage instructions are in $V_{u0} > V_{v0} > V_{w0}$ (Max=$V_{u0}$, Mid=$V_{v0}$, and Min=$V_{w0}$), the voltage area V2 is specified. Thus, the voltage correction [C] may be made as the pulse shift method based on FIG. 23 under the conditions of M1 and V2. That is, the correction [C] is made so that the voltages $V_C$ and $V_F$ essential for M1 are output. Specific voltage instruction correction is that the original voltage instructions Max, Mid, and Min are corrected in the Tc1 period and the Tc2 period to be output as Max1, Mid1, Min1 and Max2, Mid2, Min2 as illustrated in FIG. 24. The mean values of the correction results match with the original instructions Max, Mid, and Min, respectively. The correction work in FIG. 23 and FIG. 24 seems complicated, but actually it is a simple signal processing by magnitude determination and branch instruction and can be sufficiently realized by an inexpensive microcomputer.

As described above, according to the present invention, pulse shift can be realized depending on a position of the rotor and voltage instructions, thereby continuously performing stable drive without losing rotor position information over transient changes not only in the steady state of the PM motor.

Seventh Exemplary Embodiment

A seventh exemplary embodiment of the present invention will be described below.

Figure 25:
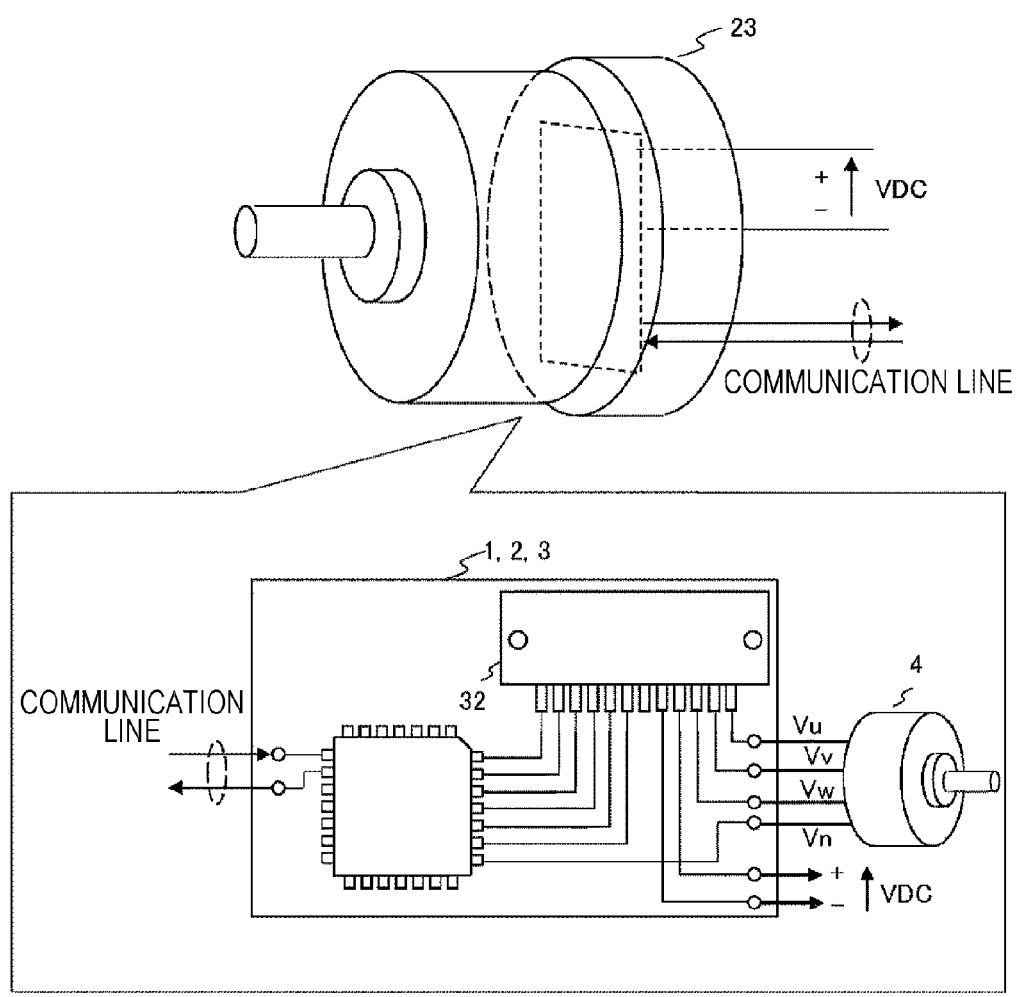
FIG. 25 is a diagram illustrating a configuration of an integrated motor drive system according to a seventh exemplary embodiment.

FIG. 25 is a diagram of a synchronous motor drive system according to the present exemplary embodiment. In the Figure, a synchronous motor drive system 23 as one system is packaged inside the motor 4. All the components are integrated in this way thereby to eliminate a wiring between the motor and the inverter. As illustrated in FIG. 25, the wirings of the integrated drive system are only a power supply line to the inverter 3 and the communication lines for returning a frequency instruction or an operation state.

The neutral point potentials of the motor 4 need to be drawn according to the present invention, but the motor and the drive circuit are integrated in this way thereby to facilitate the wirings of the neutral point potentials. Further, position-sensorless drive can be realized so that the integrated system is remarkably compact, thereby realizing a reduction in size.

Eighth Exemplary Embodiment

An eighth exemplary embodiment of the present invention will be described below.

Figure 26:
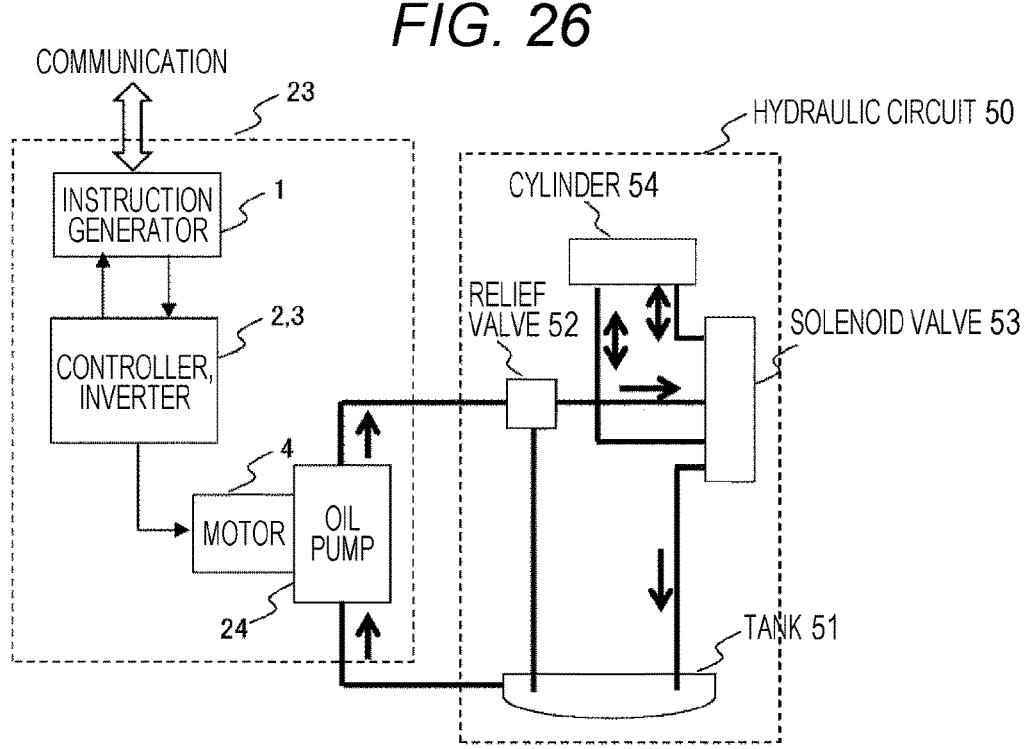
FIG. 26 is a diagram illustrating a configuration of a hydraulic pump system according to an eighth exemplary embodiment.

FIG. 26 illustrates a hydraulic drive system used for hydraulic transmission or hydraulic brake inside a vehicle. In FIG. 26, the component number 23 indicates a synchronous motor drive system in FIG. 25 in which an oil pump 24 is attached on a motor. The oil pump 24 controls a hydraulic pressure of a hydraulic circuit 50. The hydraulic circuit 50 is configured of a tank 51 for saving oil, a relief valve 52 for keeping a hydraulic pressure at a set value or less, a solenoid valve 53 for switching the hydraulic circuit, and a cylinder 54 operating as hydraulic actuator.

Figure 27:
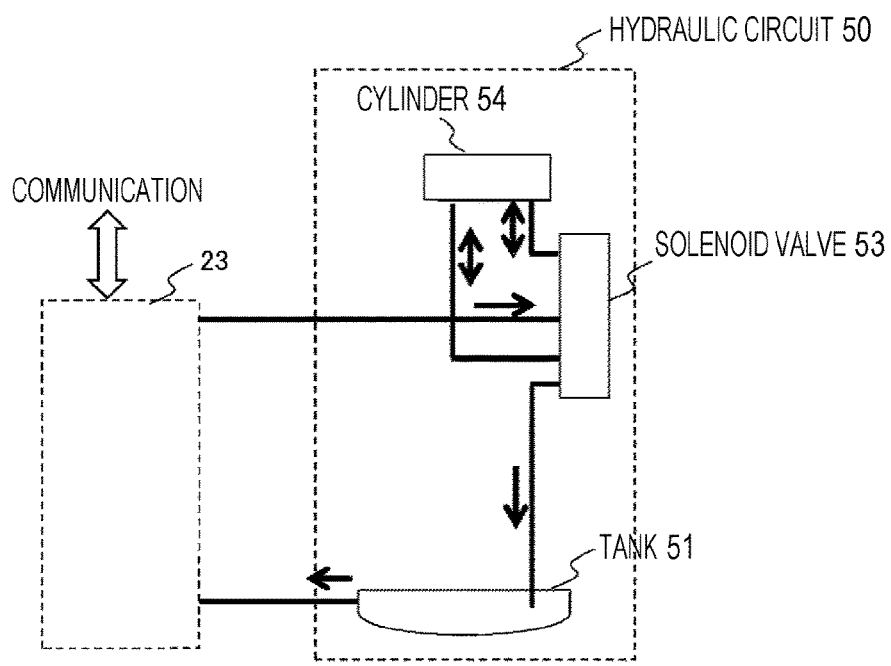
FIG. 27 is a diagram illustrating a configuration in which a relief valve is removed from the hydraulic pump system according to the eighth exemplary embodiment.

The oil pump 24 generates a hydraulic pressure by the synchronous motor drive system 23 thereby to drive the cylinder 54 as hydraulic actuator. The hydraulic circuit is switched by the solenoid valve 53 so that a load of the oil pump 24 changes and a load disturbance is caused in the synchronous motor drive system 23. More than several times higher loads may be imposed on the hydraulic circuit for the pressure in the steady state and the motor may stop. However, with the synchronous motor drive system according to the present exemplary embodiment, a position of the rotor can be estimated also in the stop state, which causes no problem. The sensorless drive so far is difficult to apply in other than the middle- and high-speed ranges, and thus a hydraulic pressure, which imposes a high load on the motor, needs to be alleviated by the relief valve 52, but the relief valve 52 can be eliminated according to the present exemplary embodiment as illustrated in FIG. 27. That is, a hydraulic pressure can be controlled without a relief valve as mechanical protection device for avoiding an excessive load on the motor.

The present exemplary embodiment has been described by way of a hydraulic control system, but may be applied for other liquid pump.

Ninth Exemplary Embodiment

A ninth exemplary embodiment of the present invention will be finally described.

Figure 28:
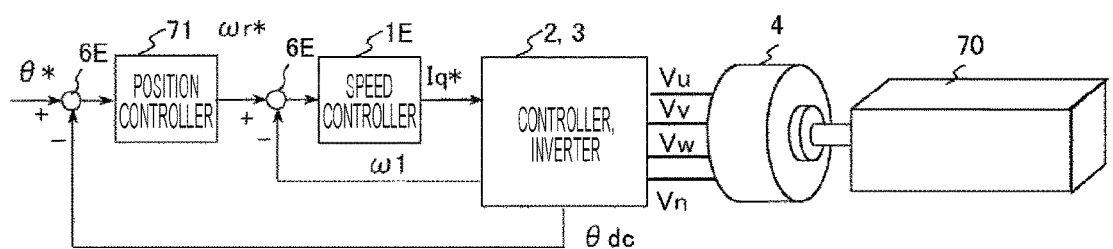
FIG. 28 is a block diagram illustrating a configuration of a positioning control system according to a ninth exemplary embodiment.

FIG. 28 illustrates a block configuration of an entire positioning apparatus using a motor. In FIG. 28, a positioning apparatus 70 is connected as load of the motor 4. An Iq* generator 1E functions as speed controller herein. Further, a speed instruction ωr* is given as output of a position controller 71 as a higher control block. A subtractor 6E makes a comparison with an actual speed ωr and calculates Iq* such that a deviation therebetween is zero. The positioning apparatus 70 uses a ball spring or the like, for example, and is adjusted by the position controller 71 such that its position is controlled to a predetermined position θ*. A position sensor is not attached on the positioning apparatus 70, and a position estimation value θdc in the controller 2 is used therefor. Thereby, position control can be performed without the need of attaching a position sensor on the positioning apparatus.

The exemplary embodiments of the present invention have been specifically described above, but the present invention is not limited to the exemplary embodiments and can be variously modified without departing from the spirit.

INDUSTRIAL APPLICABILITY

As described above, the present invention is a technique for constructing a position-sensorless synchronous motor control apparatus and a drive system using the same. The motor is usable for rotation speed control in fan, pump (hydraulic pump, water pump), compressor, spindle motor, and air conditioner, as well as conveyer, lift, extruder, and machine tool.

REFERENCE SIGNS LIST

1 Iq* generator
2 controller
3 inverter
31 DC power supply
32 inverter main circuit
33 gate driver
34 virtual neutral point potential generator
35 current detector
4 PM motor
5 Id* generator
6 adder 6
7 d-axis current controller IdACR
8 q-axis current controller IqACR
9 dq reverse converter
10 pulse width modulator
11 current reproducer
12 dq converter
13 neutral point potential amplifier
14 sample/holder
16 position estimator
15 speed calculator
17 phase setter
18 estimation parameter setter
19 zero generator
20 Vn detection voltage generator
21 switcher

The invention claimed is:

1. A synchronous motor control apparatus comprising a three-phase synchronous motor in which three-phase stator wirings are in Y connection, and an inverter for driving the motor, wherein the synchronous motor is DC-conducted thereby to move a rotor to a predetermined position, and is applied with a pulse-shaped voltage from the inverter in the moved state so that a neutral point potential as potential of the Y connection point is acquired when the pulse voltage is applied, thereby driving the synchronous motor based on the acquired value, wherein the rotor is moved at least twice by the synchronous motor, and a phase to be DC-conducted is in a range of 60 degrees relative to an electric angle of the synchronous motor thereby to acquire the neutral point potential at a respective position, and wherein an electric angle phase at a position of the U-phase stator wiring is defined as zero degrees, and a phase for DC-conducting the synchronous motor is conducted per 60 degrees with reference to a phase shifter by 15 degrees relative to the zero degrees.

2. The synchronous motor control apparatus according to claim 1, wherein the rotor is moved at least three times by the synchronous motor, and a phase to be DC-conducted is in a range of 120 degrees relative to an electric angle of the synchronous motor thereby to acquire the neutral point potential at a respective position.

3. The synchronous motor control apparatus according to claim 1, wherein a pulse-shaped voltage applied from the inverter is generated by the inverter in at least two switch states, the first switch state in the two switch states is that one phase of the three phases is in a different switch state from the remaining two phases, and the second switch state includes the inverted first switch state.

4. The synchronous motor control apparatus according to claim 1, wherein when DC-conducting the synchronous motor and acquiring the neutral point potential, the switching operation is previously performed by the inverter thereby to conduct the synchronous motor and then to perform the DC conduction and acquire a neutral point potential.

5. The synchronous motor control apparatus according to claim 1, wherein when driving the synchronous motor after acquiring the neutral point potential, a voltage pulse for observing a neutral point potential is applied by the inverter in order to observe a neutral point potential while the synchronous motor is being driven, and a rotation position of the synchronous motor is estimated and calculated based on the previously-acquired value of the neutral point potential by use of a neutral point potential at the time of application of each voltage pulse, thereby driving the synchronous motor based on the rotation position.

6. The synchronous motor control apparatus according to claim 5, wherein the voltage pulse for observing a neutral point potential while the synchronous motor is being driven uses a neutral point potential at the time of application of each voltage pulse by applying mutually-reverse voltage pulses to a triangle wave carrier during pulse width modulation of the inverter in a rise period of the triangle wave and a fall period thereof.

7. The synchronous motor control apparatus according to claim 5, wherein the voltage pulse for observing a neutral point potential while the synchronous motor is being driven changes in its direction along with a change in rotation phase of the synchronous motor.

8. The synchronous motor control apparatus according to claim 7, wherein a switching frequency of the inverter is kept at the same time with a change in direction of the voltage pulse along with a change in rotation phase of the synchronous motor.

9. The synchronous motor control apparatus according to claim 1, wherein a rotor position of the synchronous motor is estimated and calculated by a linear function based on the previously-acquired neutral point potential.

10. An integrated motor system wherein the synchronous motor control apparatus according to claim 1, and a rotor and a stator in the three-phase synchronous motor driven by the synchronous motor control apparatus are housed in a common casing.

11. A pump system comprising the synchronous motor control apparatus according to claim 1, the three-phase synchronous motor driven by the synchronous motor control apparatus, and a liquid pump driven by the three-phase synchronous motor.

12. A positioning system wherein an object is moved by the synchronous motor control apparatus according to claim 1, the three-phase synchronous motor driven by the synchronous motor control apparatus, and the motor thereby to control a position of the object.

* * * * *